Feb. 5, 1935.  D. G. TRUTNER  1,990,258
MANUFACTURE OF LAMP STEMS
Filed Sept. 21, 1933    21 Sheets-Sheet 10
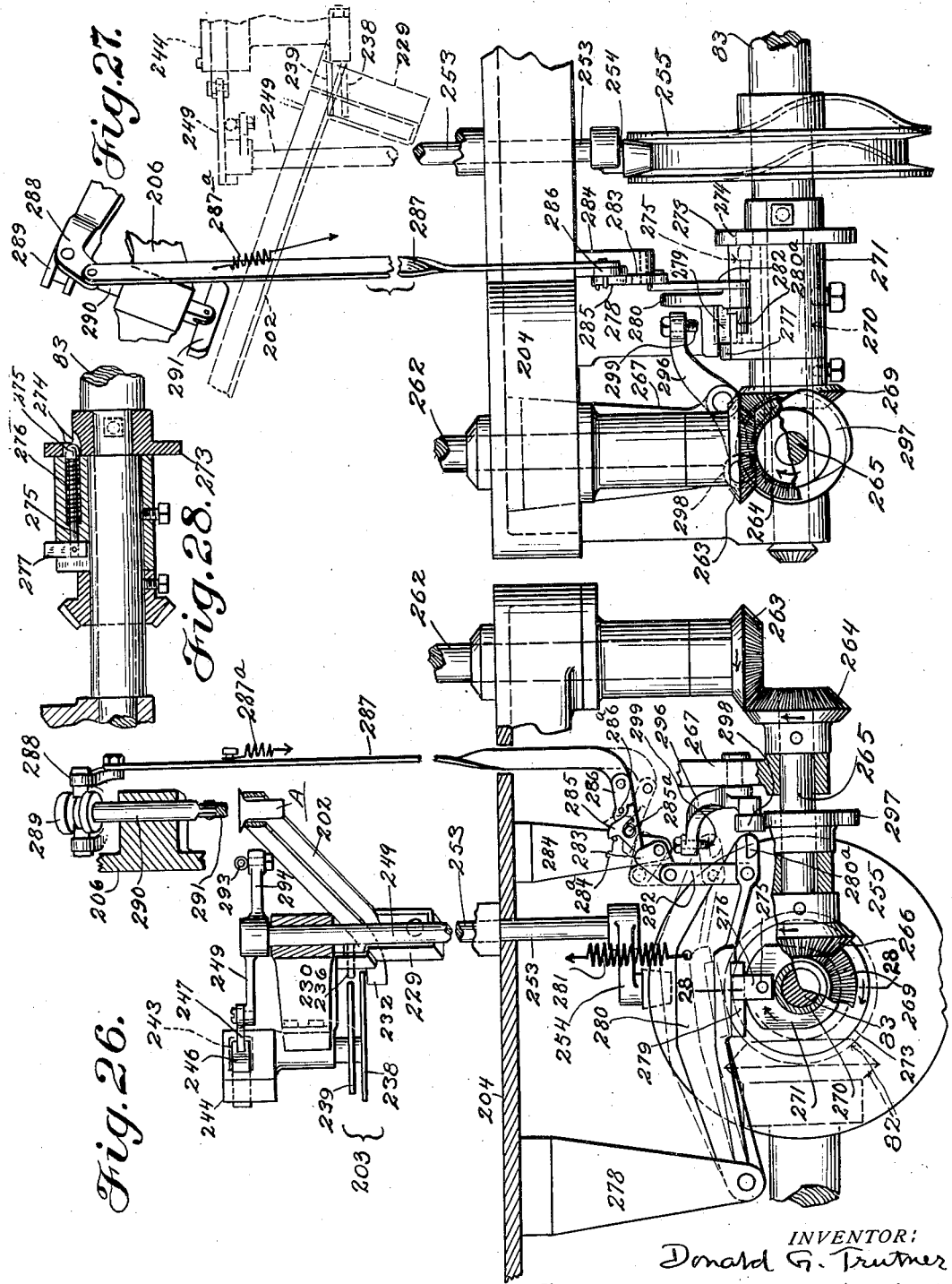
INVENTOR:
Donald G. Trutner
BY Morrison, Kennedy + Campbell
ATTORNEYS.

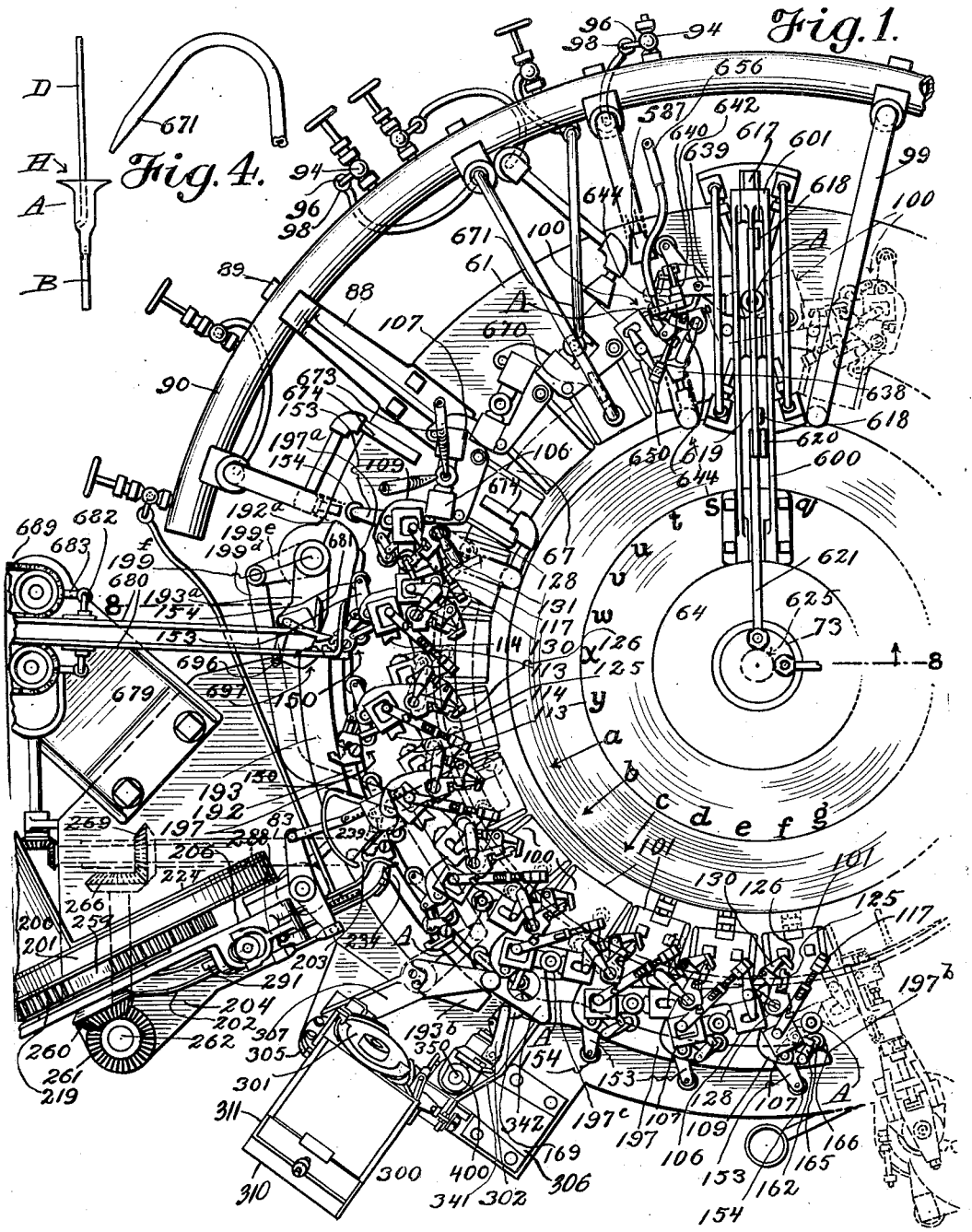

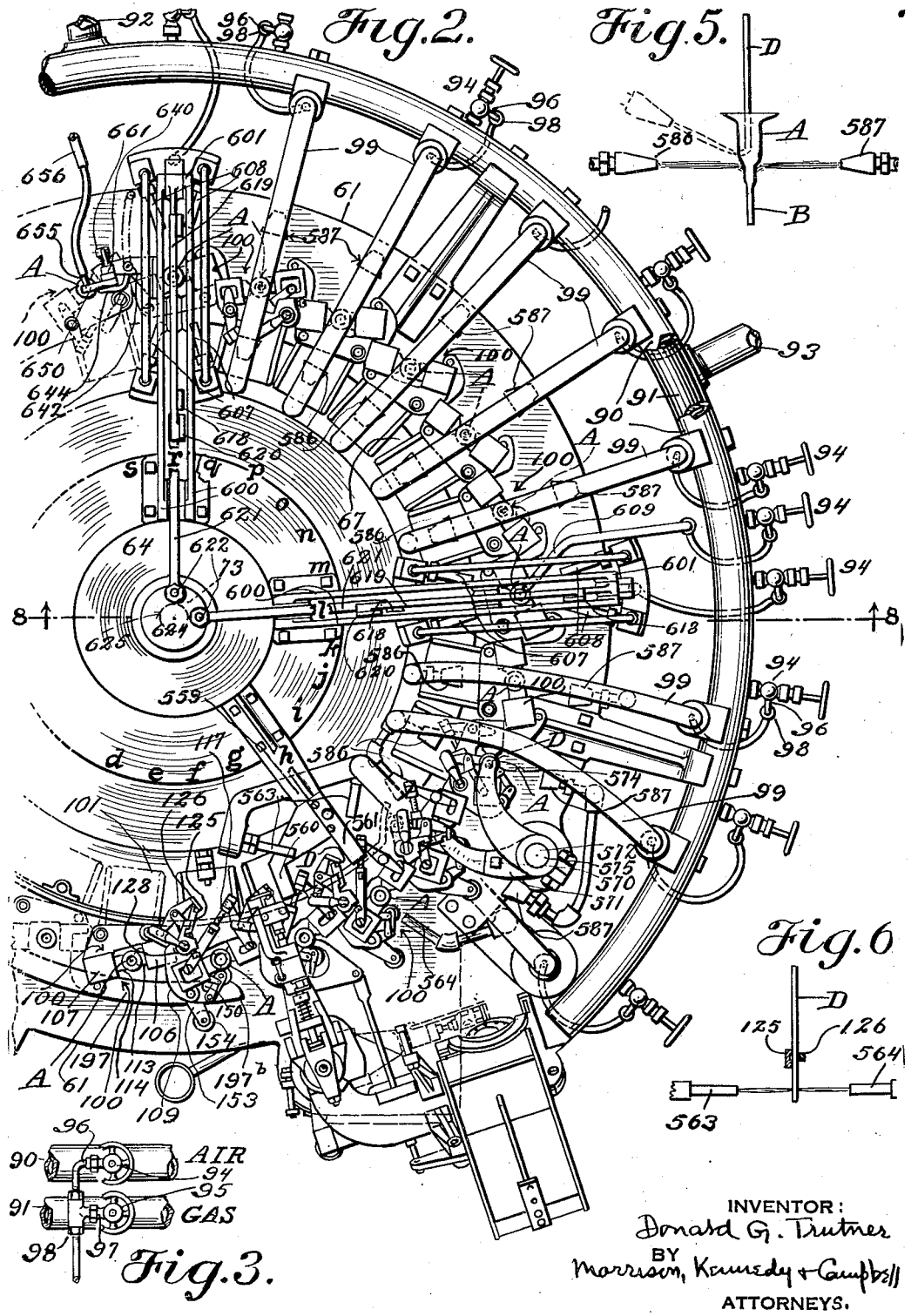

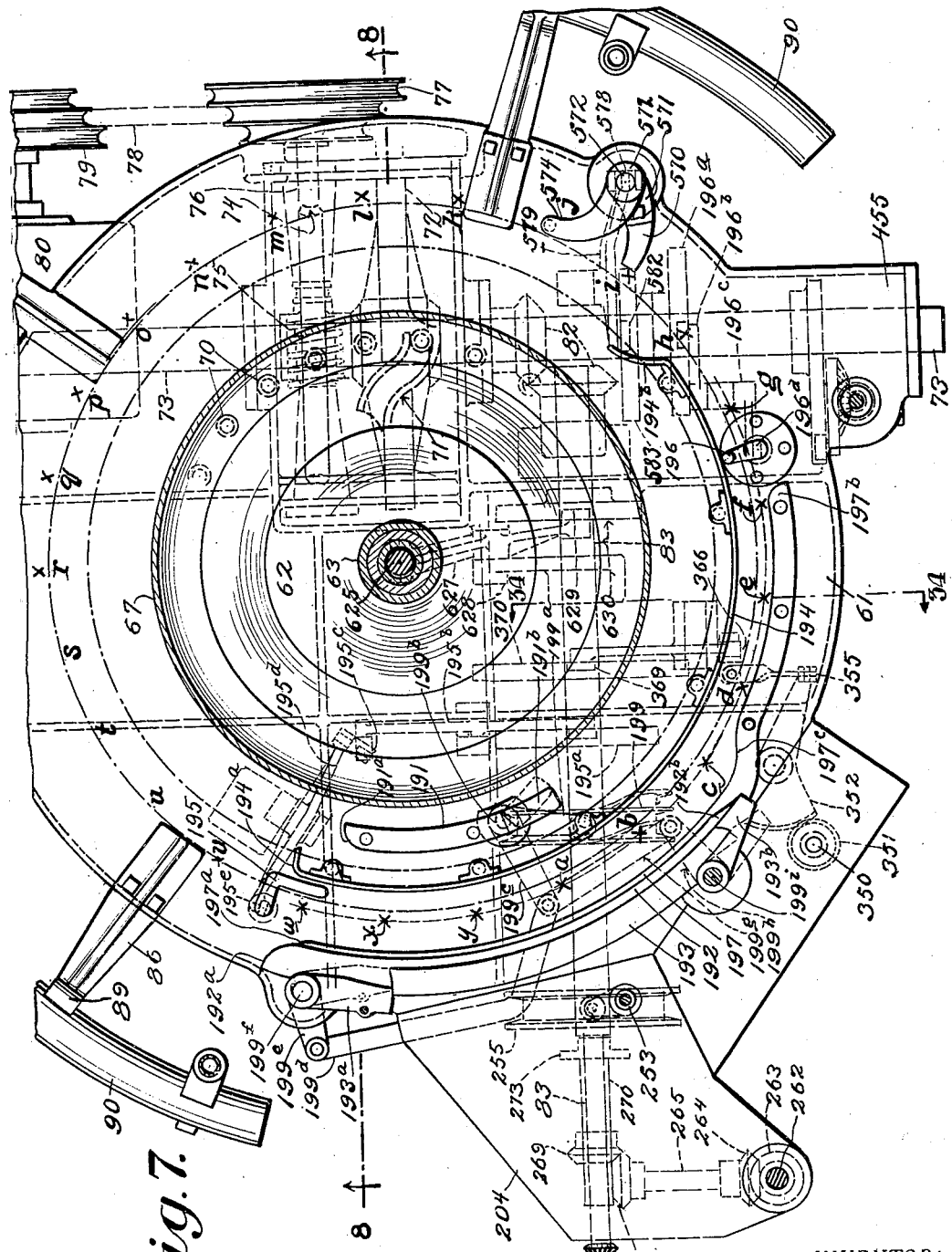

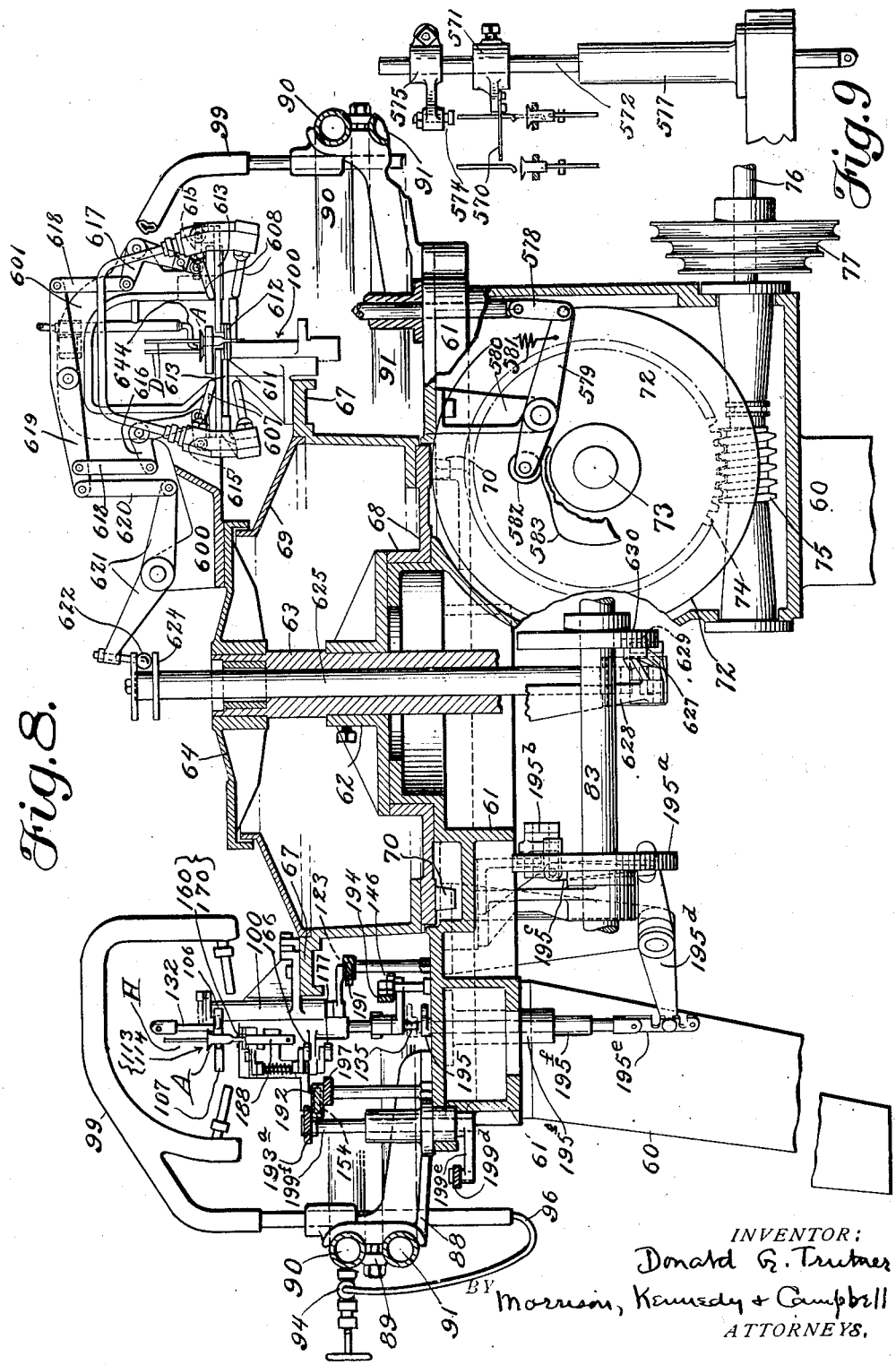

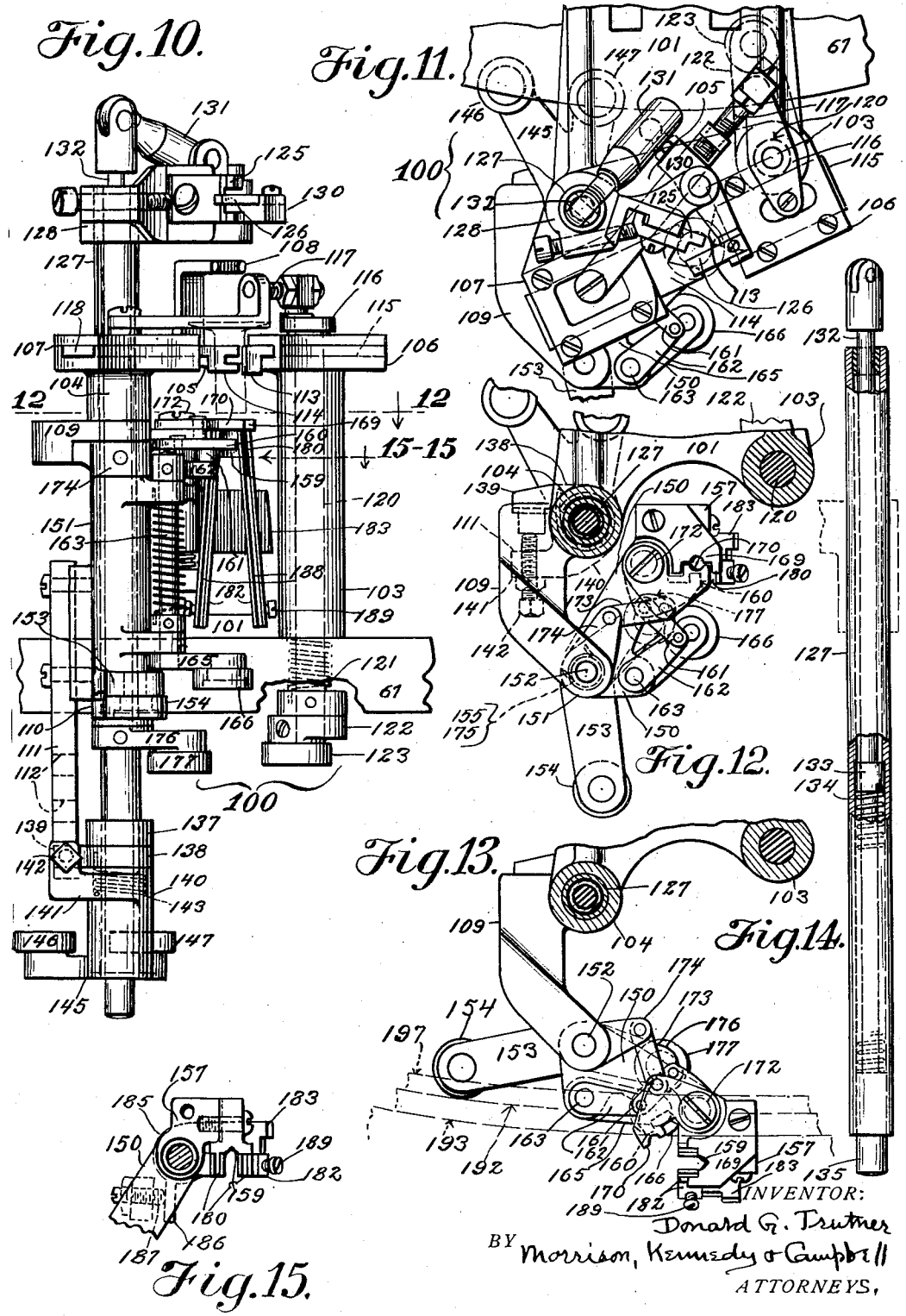

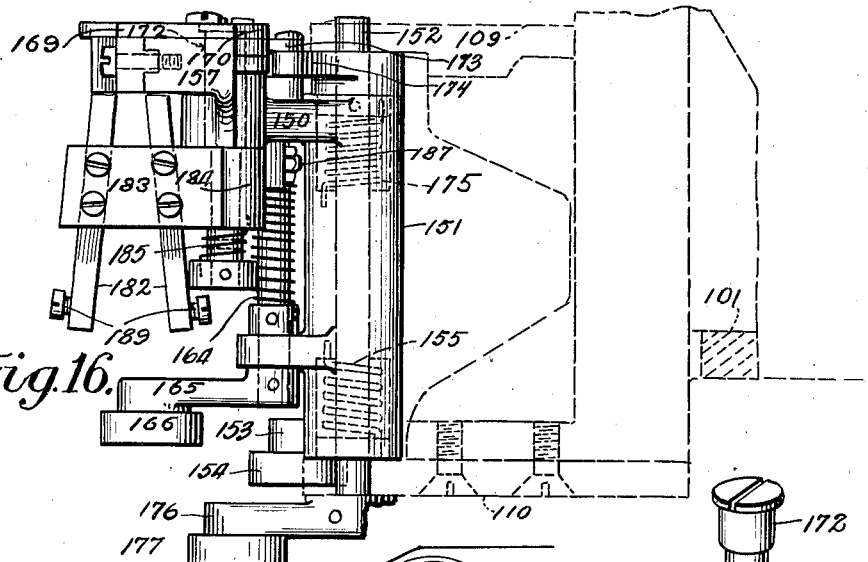
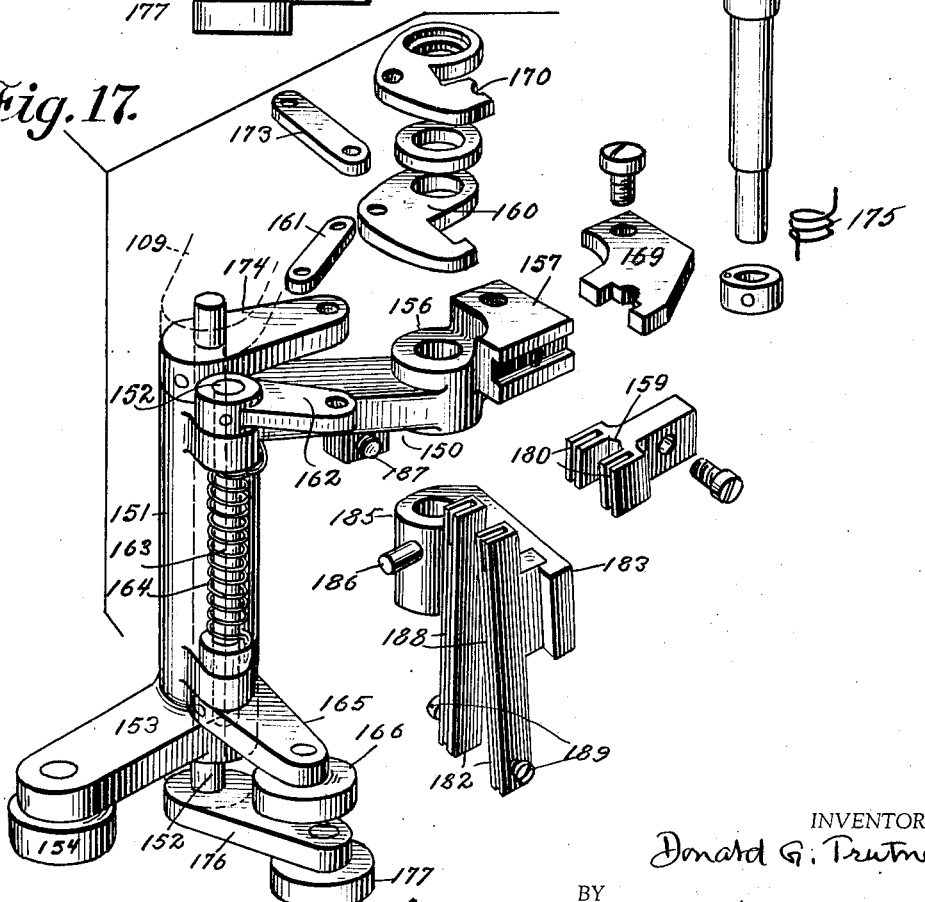

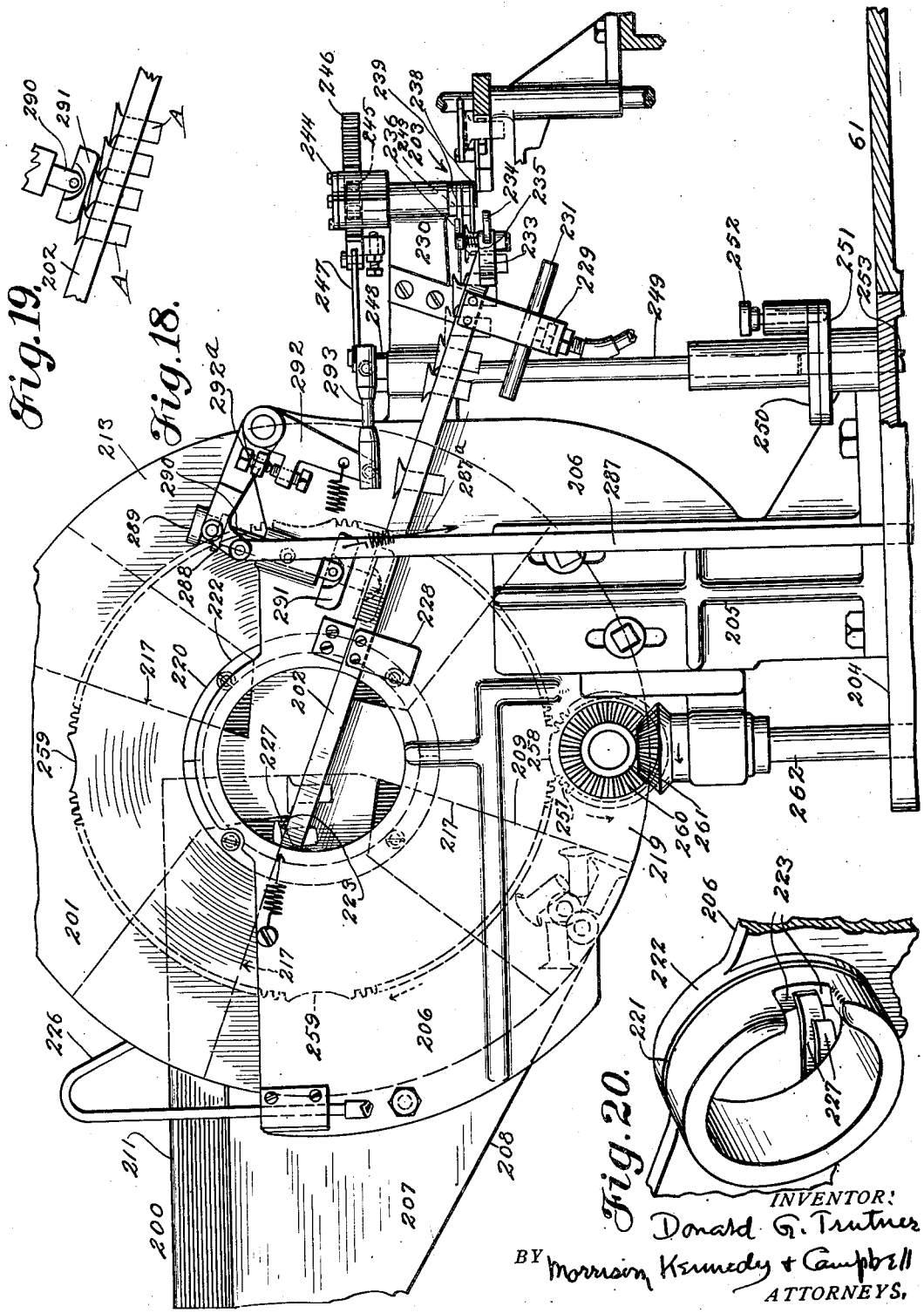

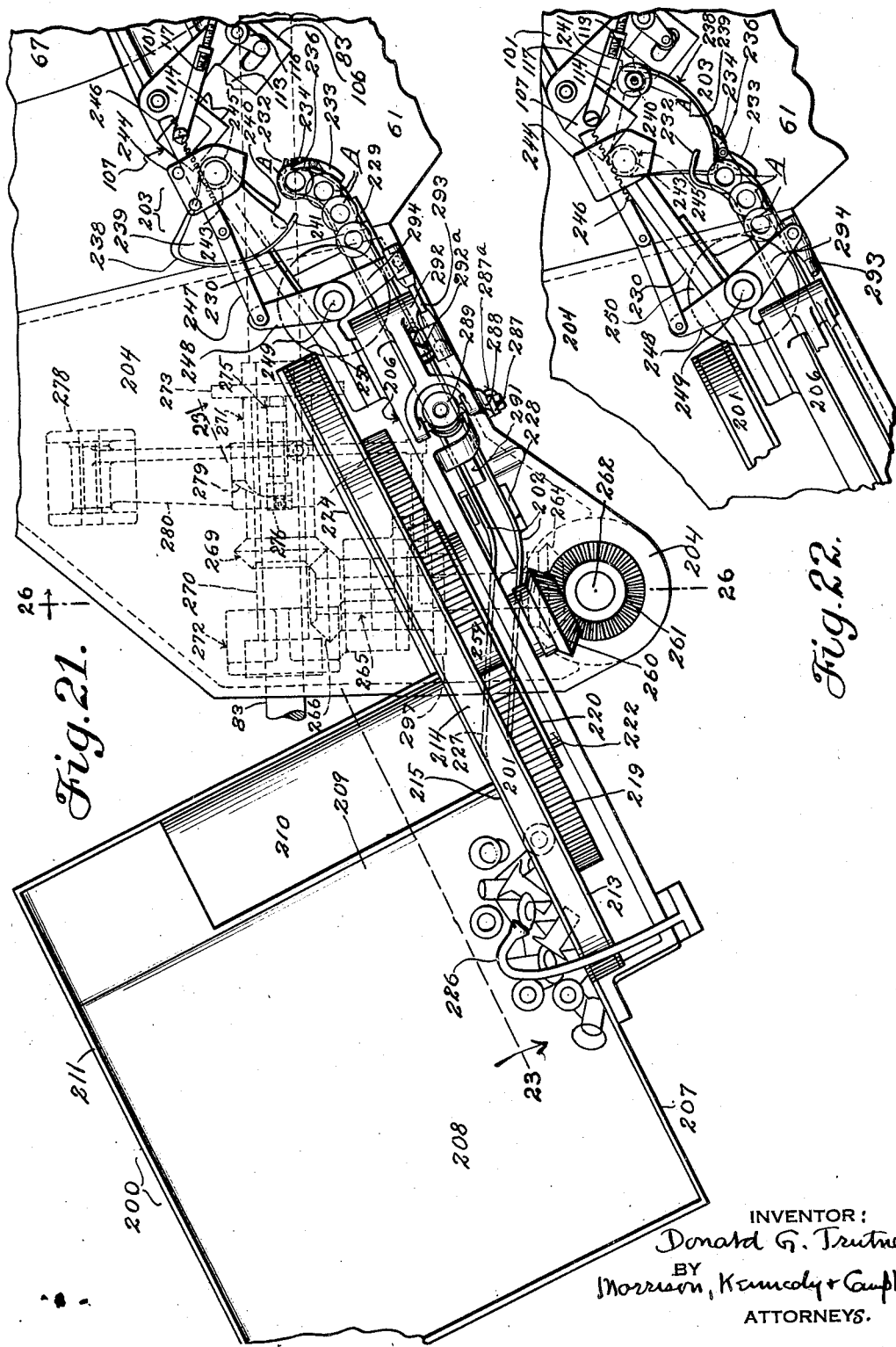

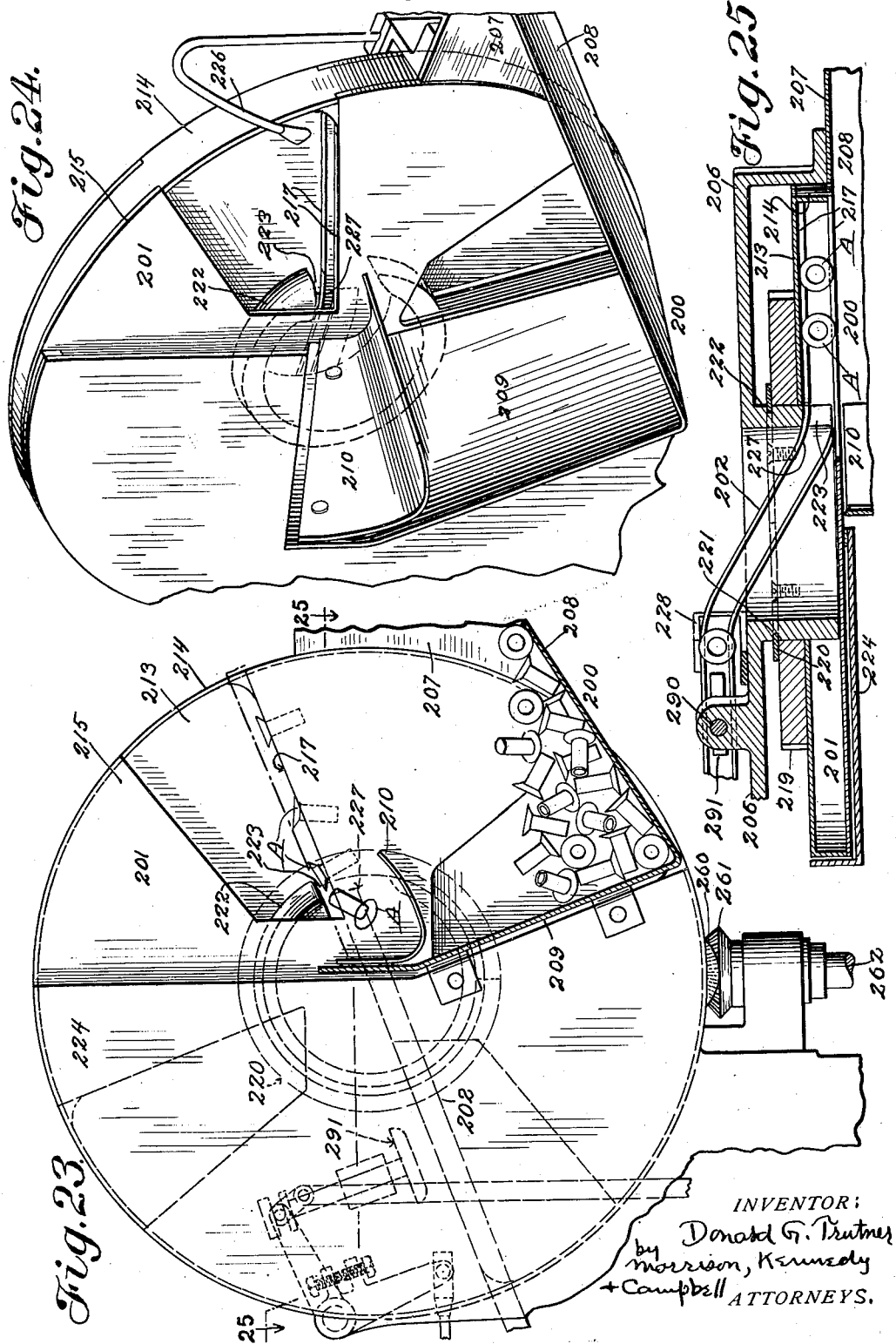

Feb. 5, 1935. D. G. TRUTNER 1,990,258
MANUFACTURE OF LAMP STEMS
Filed Sept. 21, 1933 21 Sheets-Sheet 11
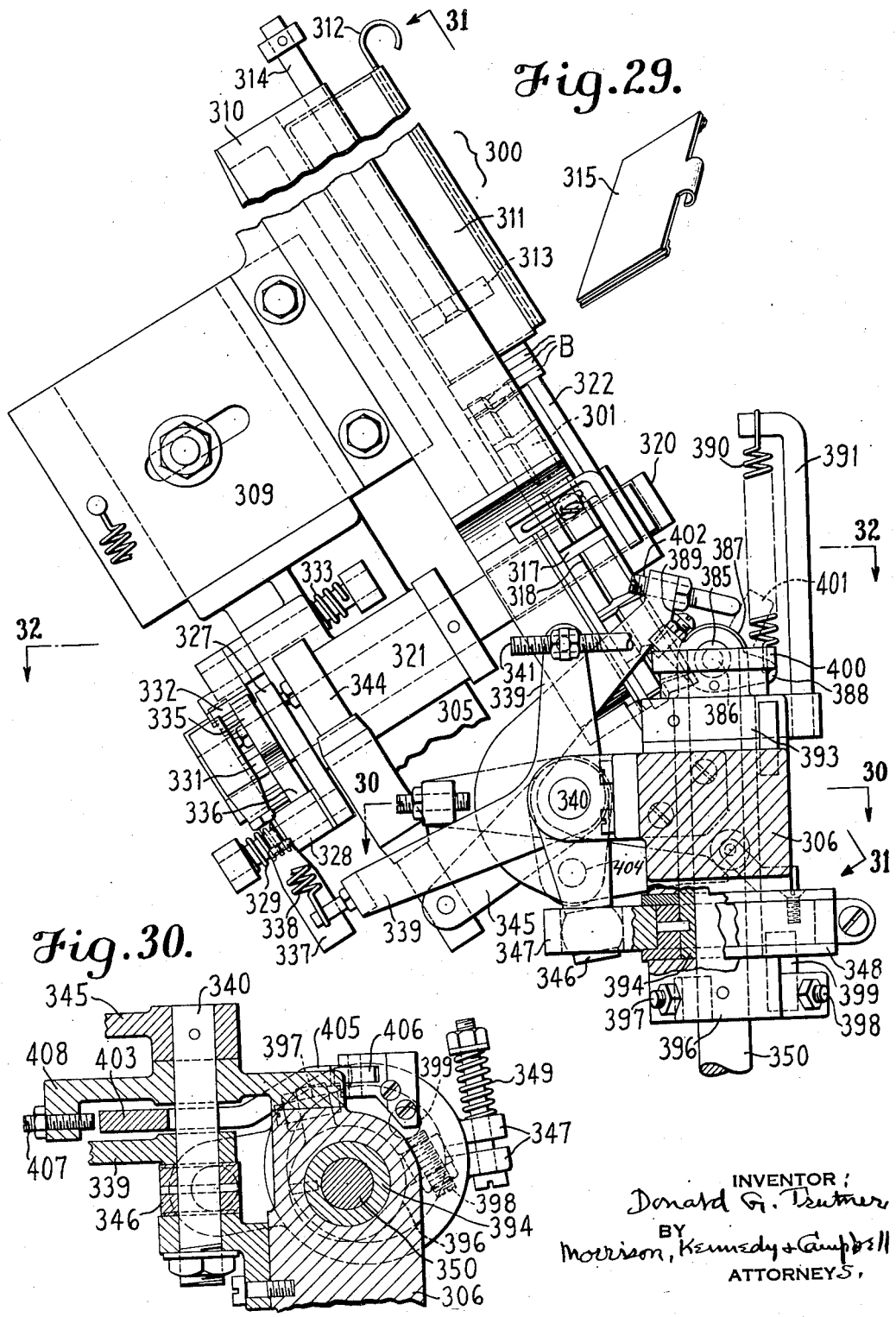

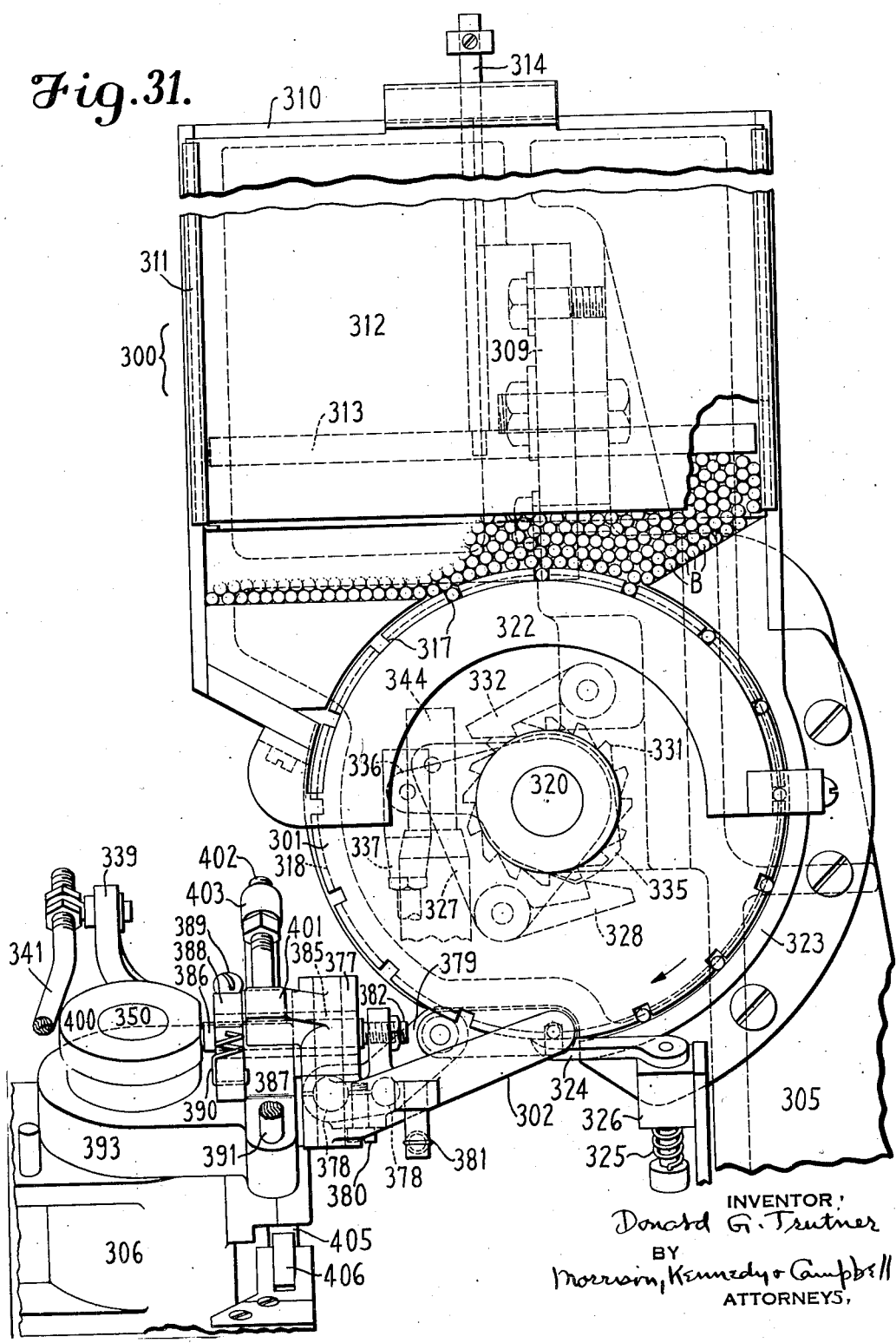

Feb. 5, 1935.  D. G. TRUTNER  1,990,258
MANUFACTURE OF LAMP STEMS
Filed Sept. 21, 1933.  21 Sheets-Sheet 13
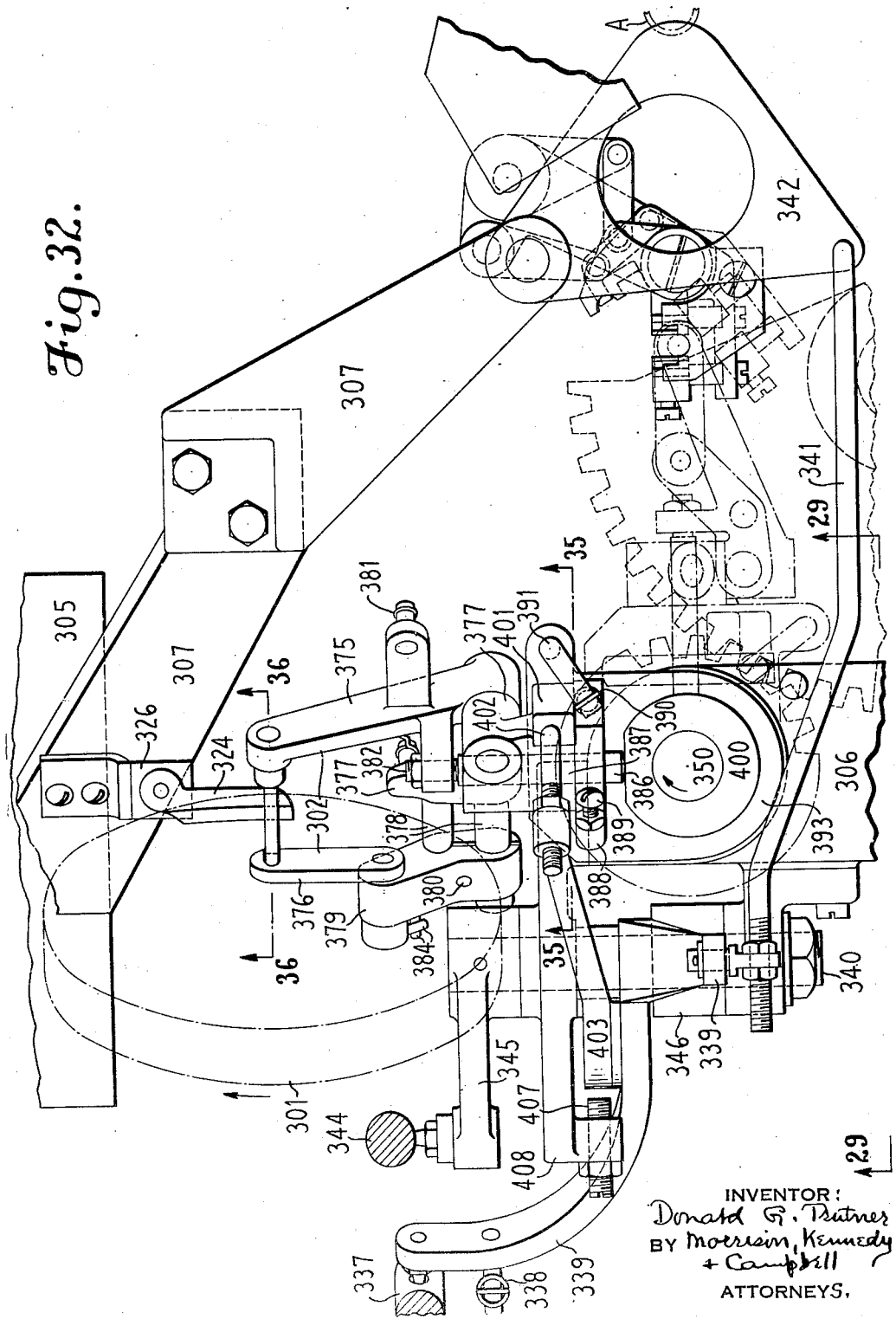

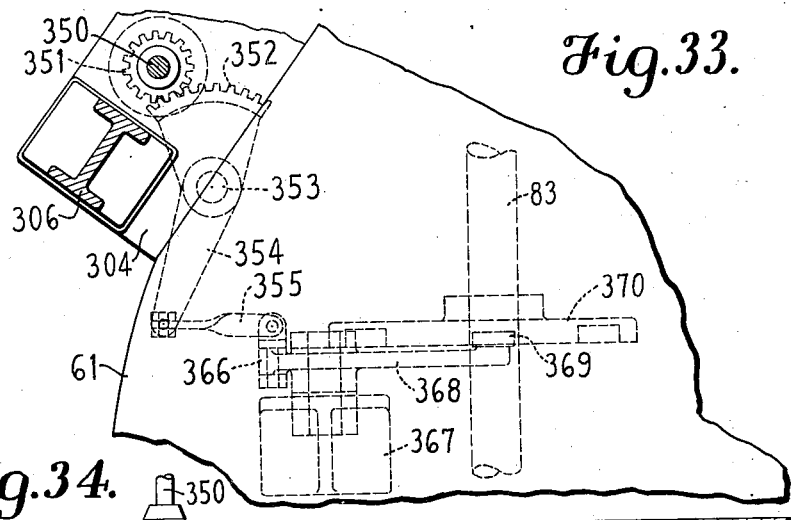
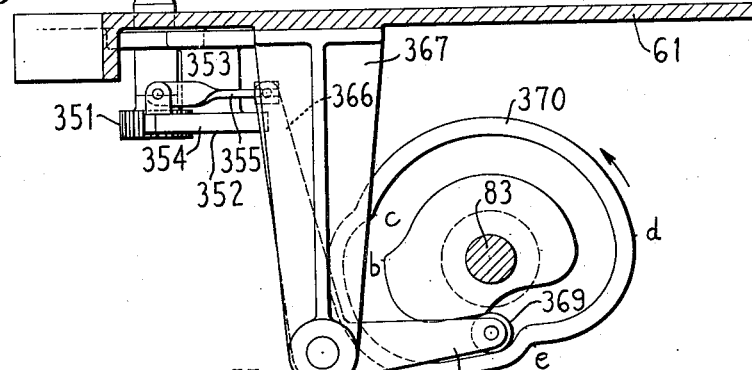
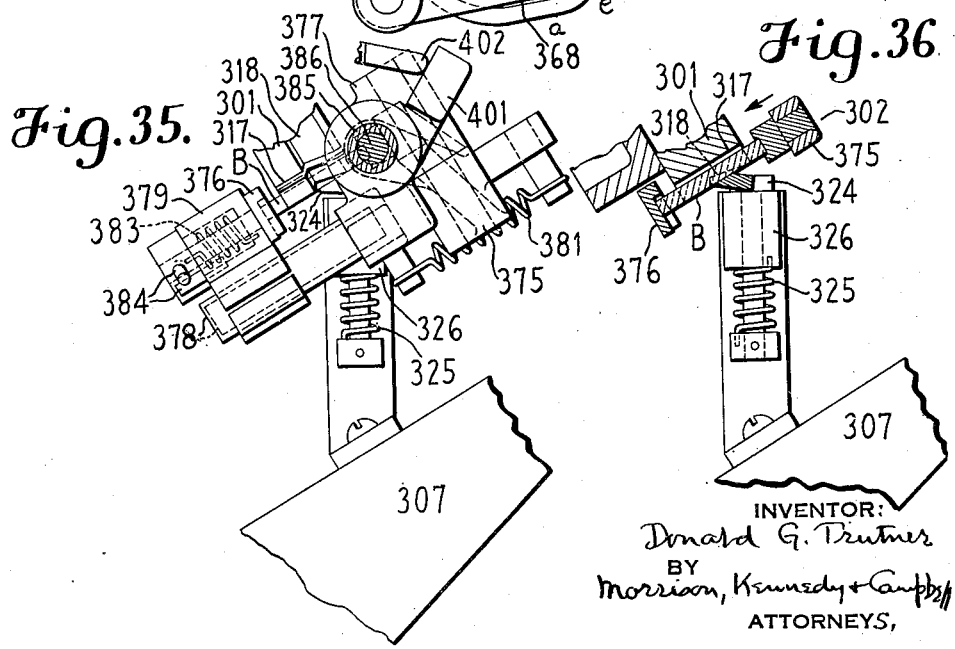

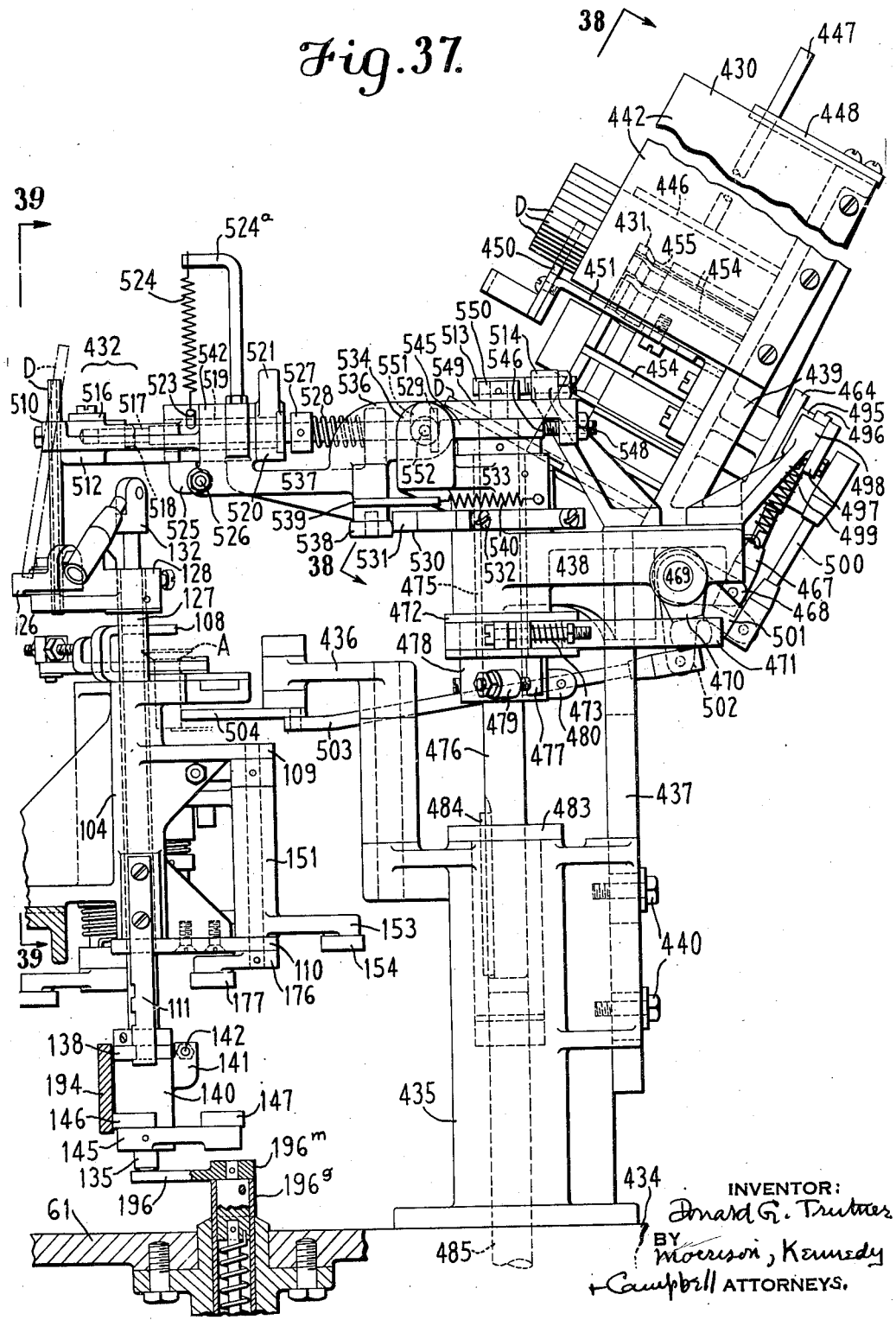

Feb. 5, 1935.   D. G. TRUTNER   1,990,258
MANUFACTURE OF LAMP STEMS
Filed Sept. 21, 1933   21 Sheets-Sheet 16
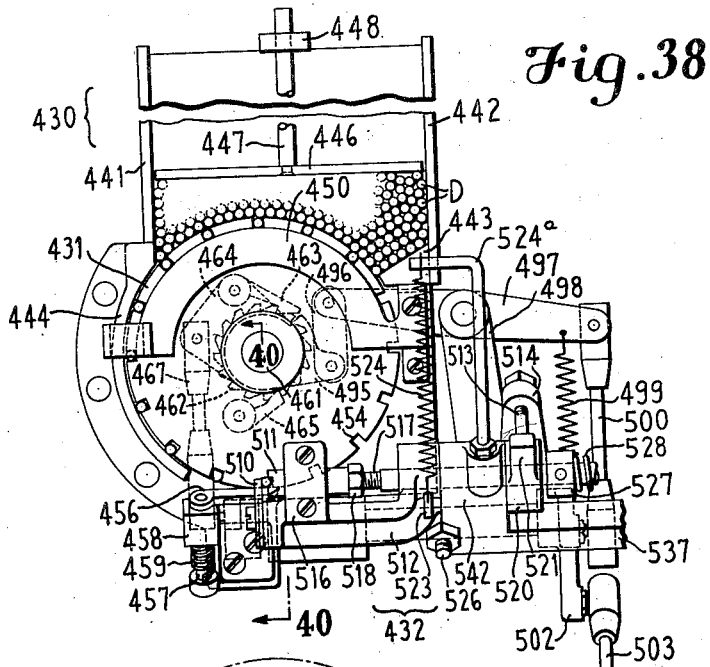
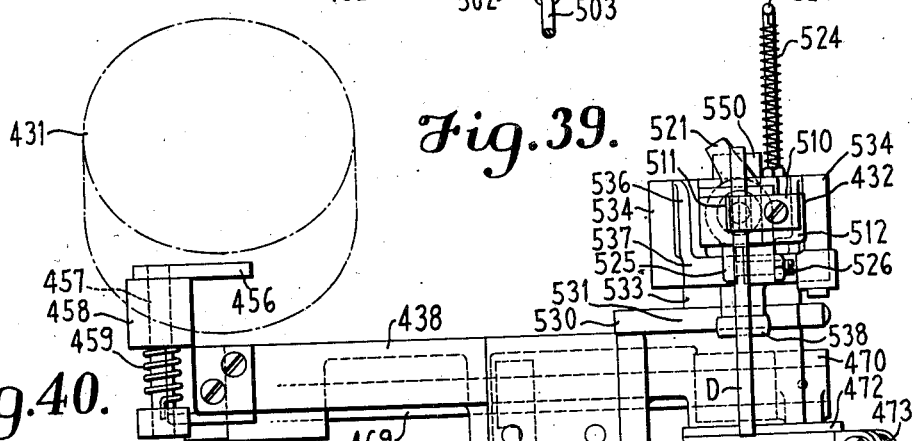
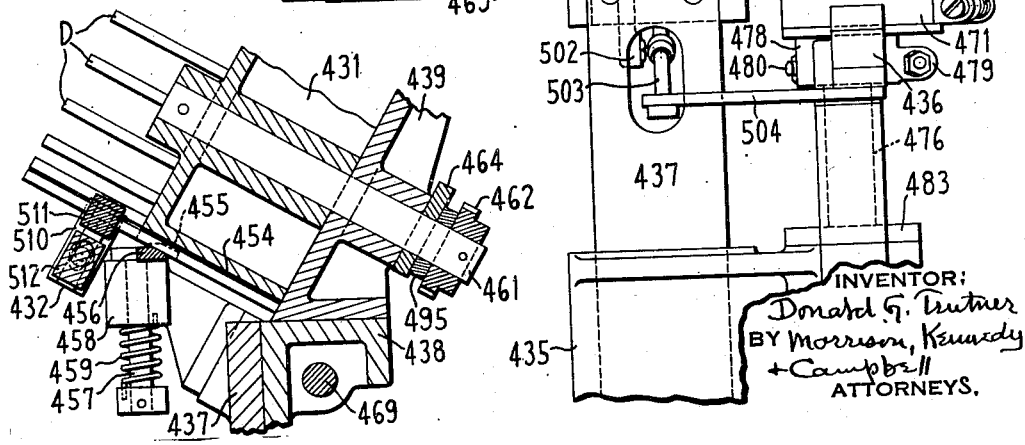
INVENTOR:
Donald G. Trutner
BY Morrison, Kennedy
+ Campbell
ATTORNEYS.

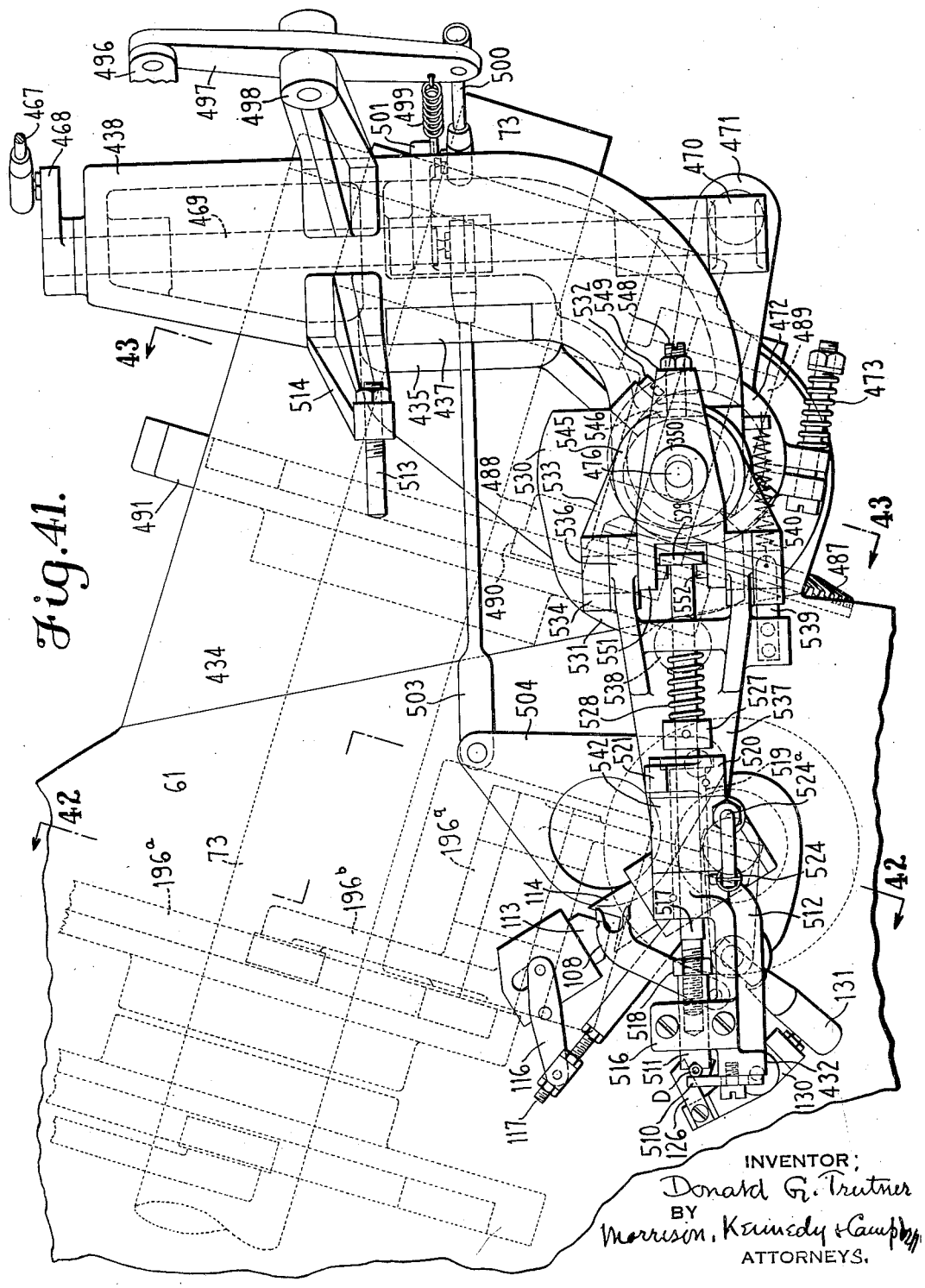

Feb. 5, 1935. D. G. TRUTNER 1,990,258
MANUFACTURE OF LAMP STEMS
Filed Sept. 21, 1933 21 Sheets-Sheet 18

INVENTOR:
Donald G. Trutner
BY Morrison, Kennedy & Campbell
ATTORNEYS.

Feb. 5, 1935.  D. G. TRUTNER  1,990,258
MANUFACTURE OF LAMP STEMS
Filed Sept. 21, 1933  21 Sheets-Sheet 19
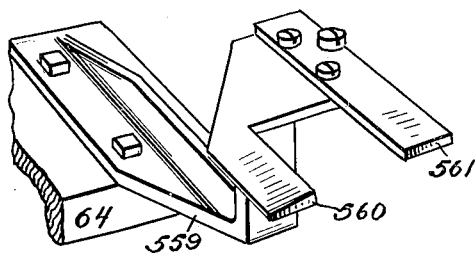
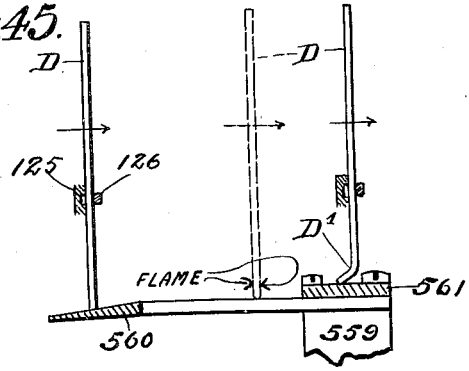
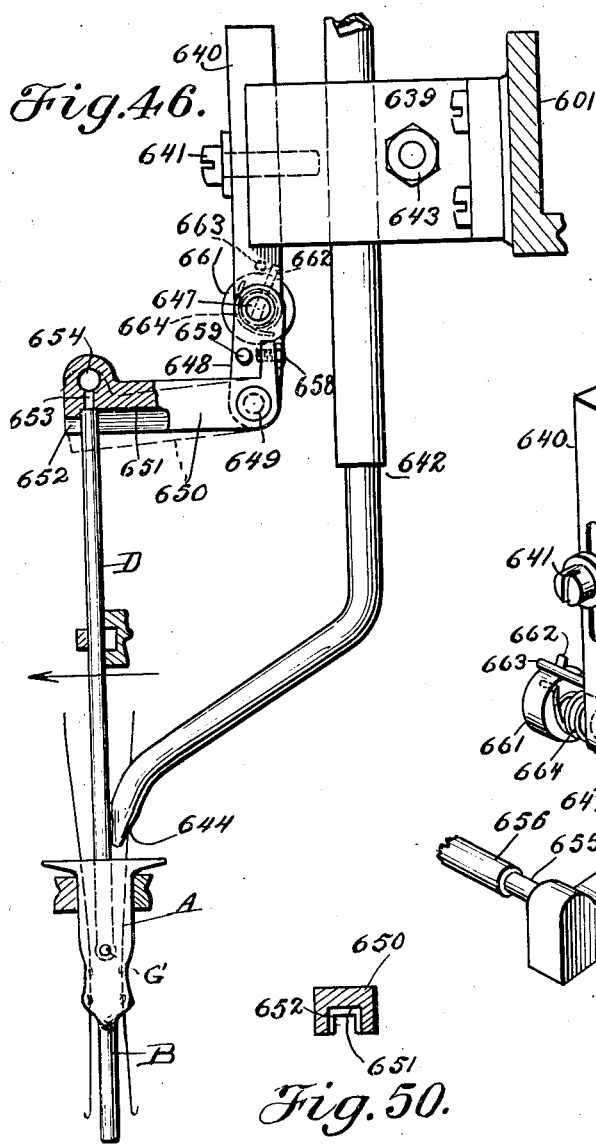

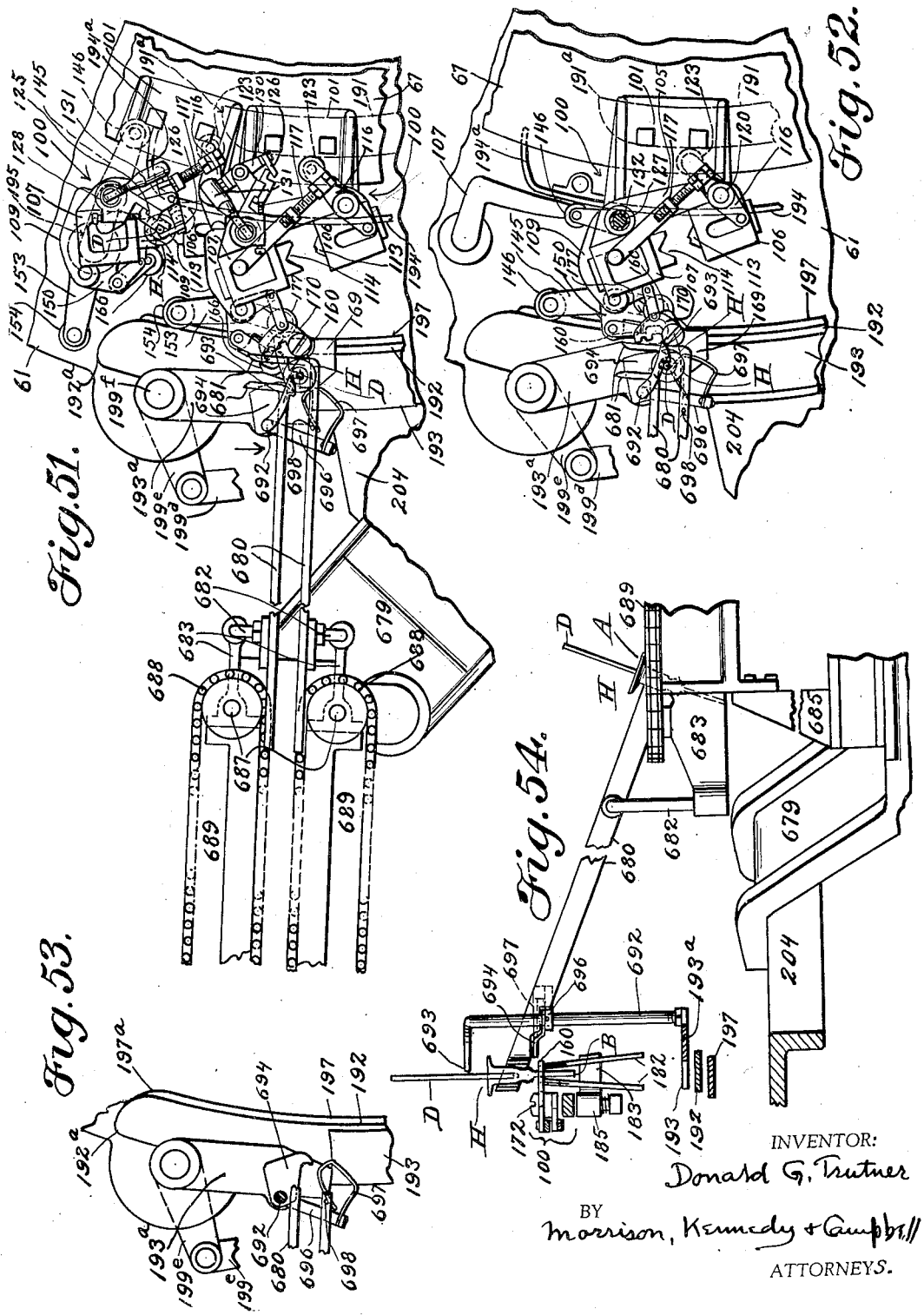

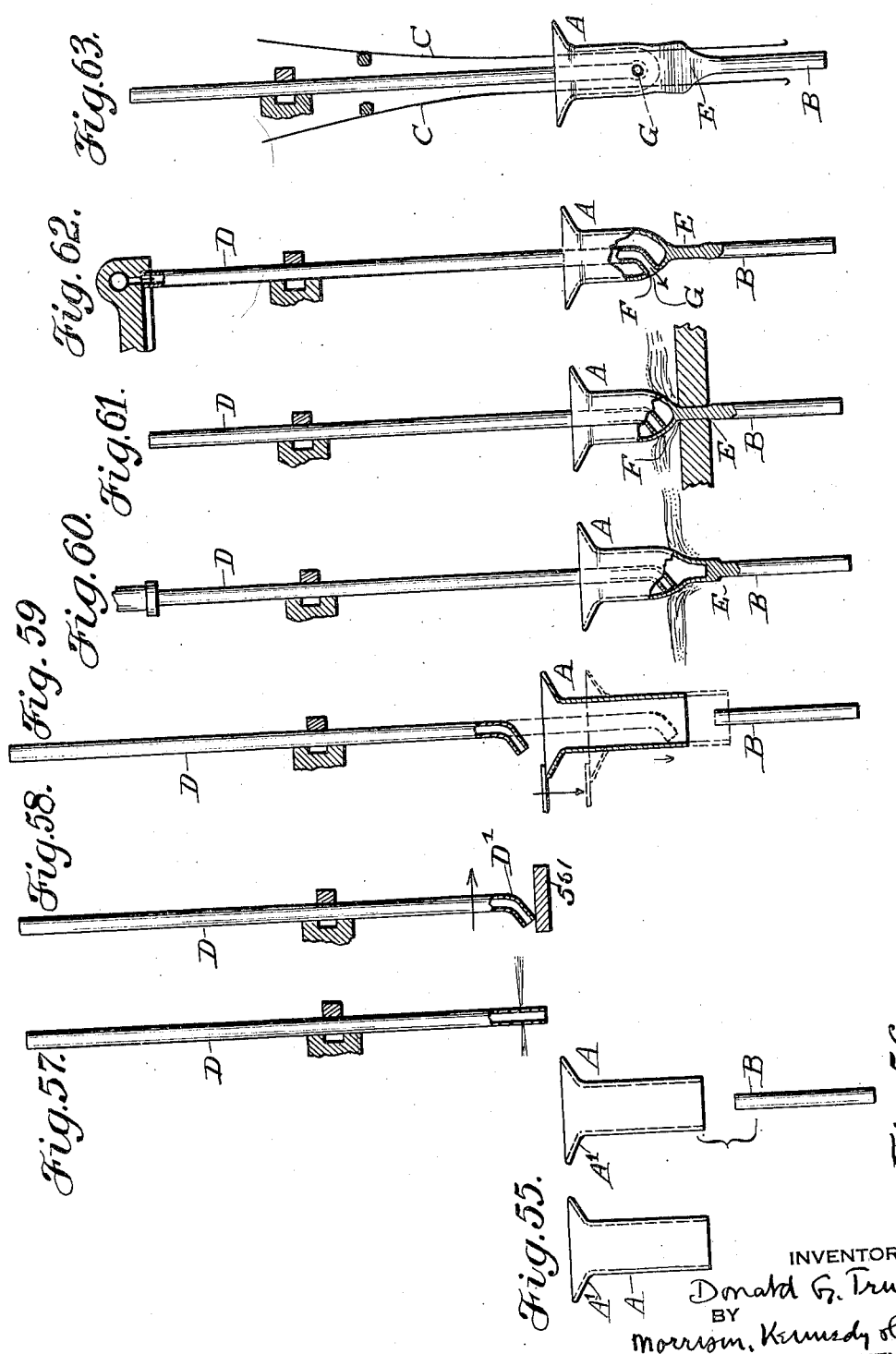

Patented Feb. 5, 1935

1,990,258

UNITED STATES PATENT OFFICE 1,990,258

MANUFACTURE OF LAMP STEMS

Donald G. Trutner, North Arlington, N. J., assignor to Alfred Hofmann & Company, West New York, N. J., a corporation of New Jersey Application September 21, 1933, Serial No. 690,297

44 Claims. (Cl. 49—2)

This invention relates to the manufacture of lamp stems; and involves a novel apparatus for the quantity manufacture of the so-called stem component of incandescent electric lamps of various classes, whether for illumination, radio or other purposes, being in the nature of bulbs or tubes containing electrodes or filaments and either exhausted of air or filled with a special gas. Such lamp stems are adapted particularly for the manufacture of tipless incandescent lamps, the bulbs of which are to be fused to the stems, and the air subsequently exhausted or replaced by a special gas. An instance of a method and apparatus for the manufacture of lamp stems of the class referred to is the prior application of H. B. Knox, Serial No. 600,403, filed March 22, 1932; and the present invention in part follows the principles of said application but also embodies features which may be used with other apparatuses.

The general object of the present invention is to afford an apparatus for combining or fusing together the essential preformed parts into the unitary completed lamp stem, ready to be fused to the lamp bulb, such parts including the so-called glass flare, which may be of usual form, the small glass tube or exhaust pipe for exhausting air or introducing gas, usually two or more leadwires passing through and sealed in the completed stem, and in some cases an upstanding post or cane to assist in anchoring or supporting the lamp filament. A further object is to permit the performance in an efficient and automatic manner of the successive steps involved, and in rapid succession so as to deliver a large output. Further objects include the providing of an apparatus which is durable, convenient of control and capable of smooth operation at a high speed consistent with the operations to be performed.

Other objects and advantages will be explained in the hereinafter following description of an illustrative embodiment of the invention or will be understood to those skilled in the subject. To the attainment of such objects and advantages the invention consists in the novel method and apparatus for manufacturing lamp stems, and the novel features of operation, combination and construction, herein illustrated or described.

The complete embodiment of all features of the present invention may advantageously be first outlined as follows. The machine is preferably of the circular type having an advancing carrier or large rotary turret supported on a suitable frame and having power means to drive it advancingly in one direction. On the turret is an extended series of successive heads and the turret and heads are advanced preferably with an intermittent or step by step motion; some of the operations being performed while each head and its carried product remain stationary at designated stations, other operations taking place during or by reason of the advancing travel. To avoid confusion in terminology the term front will be used to indicate a direction or position outwardly with respect to the circular series of heads, or the vertical axis of the turret, the term back or rear indicating the reverse thereof. The terms in and out will usually be employed in reference to each of the heads, inward meaning toward the vertical axis of the head, and outward the reverse thereof.

Each head comprises a number of operative devices, including what will be termed holders or chucks, there being a holder or chuck for the flare, a second holder or chuck for the cane, a holder for the leadwires, and a holder or chuck for the exhaust pipe; these several devices being automatically operable in proper sequence.

Twenty-five heads are shown, and at each cycle or drive shaft rotation each head advances from one station to the next, undergoing certain operations at or between stations. At a speed of five seconds per rotation or cycle 720 products may be made per hour, but a considerably faster speed is possible, as 1200 lamp stems per hour. The complete sequence of operations extends through substantially the entire period of the machine from the first to the last station.

From the starting point, beyond the outfeed or delivery, each head passes first to an infeeding mechanism for the flares. A supply of flares is contained in a hopper and the individual flares are fed therefrom and one at a time transferred into central position in the head with the skirt or flared end thereof upward. The flare chuck thereupon engages the flare and holds it until the completion of the cycle.

Preferably each head next passes on the cane infeeding mechanism and receives the cane or glass rod. A supply of canes is maintained in a hopper and at the proper time the mechanism transfers a cane from the hopper to a central position in the head below the flare already received therein.

Preferably at a subsequent position the leadwires are inserted in the flare from above. While this may be performed automatically it is herein done manually, the head containing a holder in the nature of stops or fingers to hold the leadwires in position.

At a subsequent station the exhaust pipe is transferred from a hopper by the pipe feed mechanism to a position in the head above the level of the flare, but preferably offset or back of the axis of the head, that is, nearer to the axis of the turret. The four component elements of the lamp stem have now been assembled in the head, but not in their final relative positions.

The next operation is preferably the bending of a short length of the lower end of the exhaust pipe into an inclined shape on the principles described in said application 600,403. This operation is preceded by suitable heat-softening, preferably by gas flames, and may be performed during and by reason of the advancing travel of the head, or while at a station.

Adjustment of the components to their proper relative positions may now be effected. Thus the flare at one station is shifted or pressed downwardly to surround the upper end of the cane, while the exhaust pipe is swung in to the axis, preferably during travel, the pipe then, at the next station, being shifted or pushed downwardly into position within the flare, with the open terminus of its bent end in contact with the glass wall of the flare.

After suitable heat-softening of the lower end of the flare and the upper end of the cane, these parts may now be compressed or squeezed by a pinching mechanism to fuse them together and at the same time to embed and fix the leadwires in the product. The compressing mechanism may be duplicated for a second or final pinching operation; and during these operations the flare wall may be permanently fused to the bent end of the exhaust pipe.

At a later position the open top end of the exhaust pipe is coupled to an air supply passage, and air pressure applied while the flare is again heat-softened, the air stream thus breaking through the flare wall and producing the perforation through which the exhaust pipe subsequently is to connect with the interior of the lamp. The perforation exit may next be smoothed by heating.

The final operations comprise the release of the product by the opening of the flare and wire chucks and the opening and swinging back of the pipe chuck, leaving the product held by the cane chuck. The cane chuck thereupon shifts frontwardly with the product, and is opened or operated to release the product as the latter is received by the outfeeding or delivery mechanism.

In the accompanying drawings Figure 1 is a top plan view of one half, and Fig. 2 is a similar view of the other half, of a lamp stem manufacturing machine embodying the present invention. Fig. 3 is a front elevation of a detail of the gas and air connections.

Fig. 4 is a diagram showing in elevation the manner of directing a supporting air jet into the flare during perforation and at other times. Fig. 5 is a similar diagram showing the disposition of the flames for softening the flare and cane for the pinching operation, and in dotted lines the additional jet for perforating. Fig. 6 is a similar view showing the disposition of the flames for the pipe bending operation.

Fig. 7 is a plan view of the machine underneath the rotary turret and parts carried by it, and showing details of the operating cams and connections below the turret.

Fig. 8 is a vertical central section of the machine taken on the plane 8—8 of Figs. 1, 2 and 7.

Fig. 9 is a side elevation of the flare and pipe lowering devices.

Figs. 10 to 17 show in detail one of the heads or units of the series carried on the turret. Fig. 10 is a front or outside elevation of the head. Fig. 11 is a top plan view thereof. Figs. 12 and 13 are horizontal section views taken on the plane 12—12 of Fig. 10, showing different positions. Fig. 14 is an elevation, partly broken away, of the pipe chuck closing and opening rod. Fig. 15 is a top view of certain details below the line 15 of Fig. 10.

Fig. 16 is an elevation view looking in the direction of the arrow 16 in Fig. 13 showing the swinging carriage that carries the cane and leadwire chucks; and Fig. 17 is an exploded view of the parts comprised in Fig. 16.

Fig. 18 is a right elevation of the flare hopper and infeeding mechanism, and Fig. 19 is a similar side view of a detail thereof in a different position. Fig. 20 is a perspective view of a detail of the hopper.

Fig. 21 is a top plan view of the flare infeeding mechanism of Fig. 18, and Fig. 22 is a partial similar top view showing certain parts in a different position.

Fig. 23 is a left elevation of the flare hopper interior, partly in section on the plane 23—23 of Fig. 21. Fig. 24 is a perspective view of a part of the interior of the flare hopper. Fig. 25 is a horizontal section view taken on the line 25—25 of Fig. 23.

Fig. 26 is an elevation partly in vertical section on the line 26—26 of Fig. 21; and Fig. 27 is an elevation, looking toward the right hand side of Fig. 26; these showing the cams and connections for actuating the flare infeeding mechanism. Fig. 28 is a detail view taken in section on the line 28—28 of Fig. 26.

Fig. 29 is a right elevation view of the cane hopper and infeeding mechanism, with certain details shown in vertical section on the line 29—29 of Fig. 32 and other details on the line 29ª of Fig. 32. Fig. 30 is a horizontal section taken on the plane 30—30 of Fig. 29.

Fig. 31 is a back view of the mechanism shown in Fig. 29, taken on a downward slant as indicated by the line 31—31.

Fig. 32 is a top plan view thereof taken below the line 32—32 of Fig. 29, with the hopper omitted but the feed wheel position indicated in dotted lines.

Fig. 33 is a plan view partly in section of the cane feed operating connections seen in Fig. 34. Fig. 34 is an elevation view partly in section on the line 34—34 of Fig. 7. Fig. 35 is an elevation view partly in section on the line 35—35 of Fig. 32. Fig. 36 is a vertical section taken on the line 36—36 of Fig. 32.

Fig. 37 is a left elevation view of the exhaust pipe infeeding mechanism.

Fig. 38 is a partial rear elevation looking at a downward slant as indicated by the line 38—38 of Fig. 37. Fig. 39 is a rear elevation, at line 39 on Fig. 37, of the pipe feeding mechanism with the hopper omitted but the feed wheel position indicated. Fig. 40 is a section view taken on the line 40—40 of Fig. 38.

Fig. 41 is a plan view showing the pipe feeding mechanism with the hopper omitted.

Figure 43:
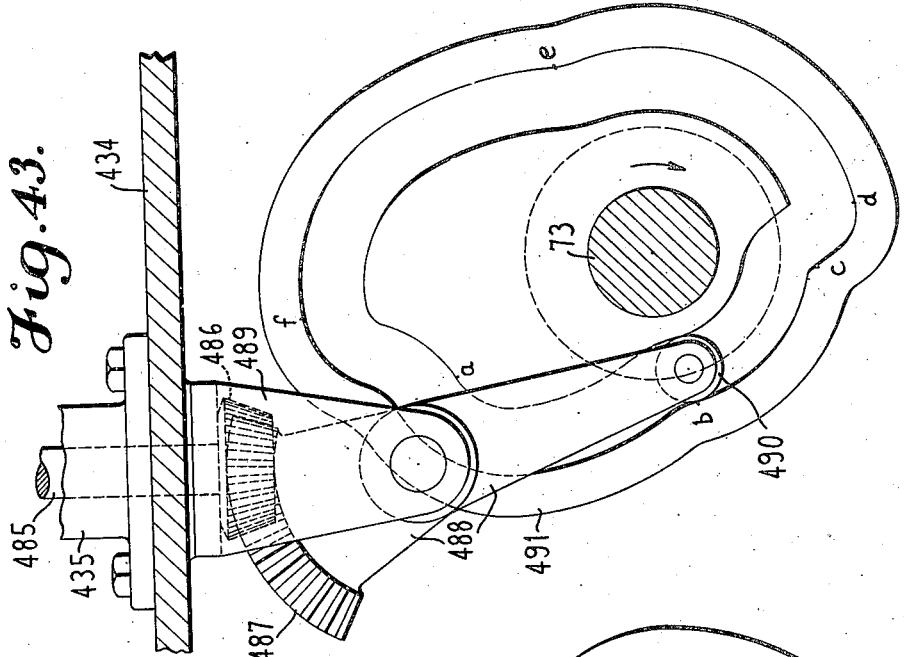
Figure 42:
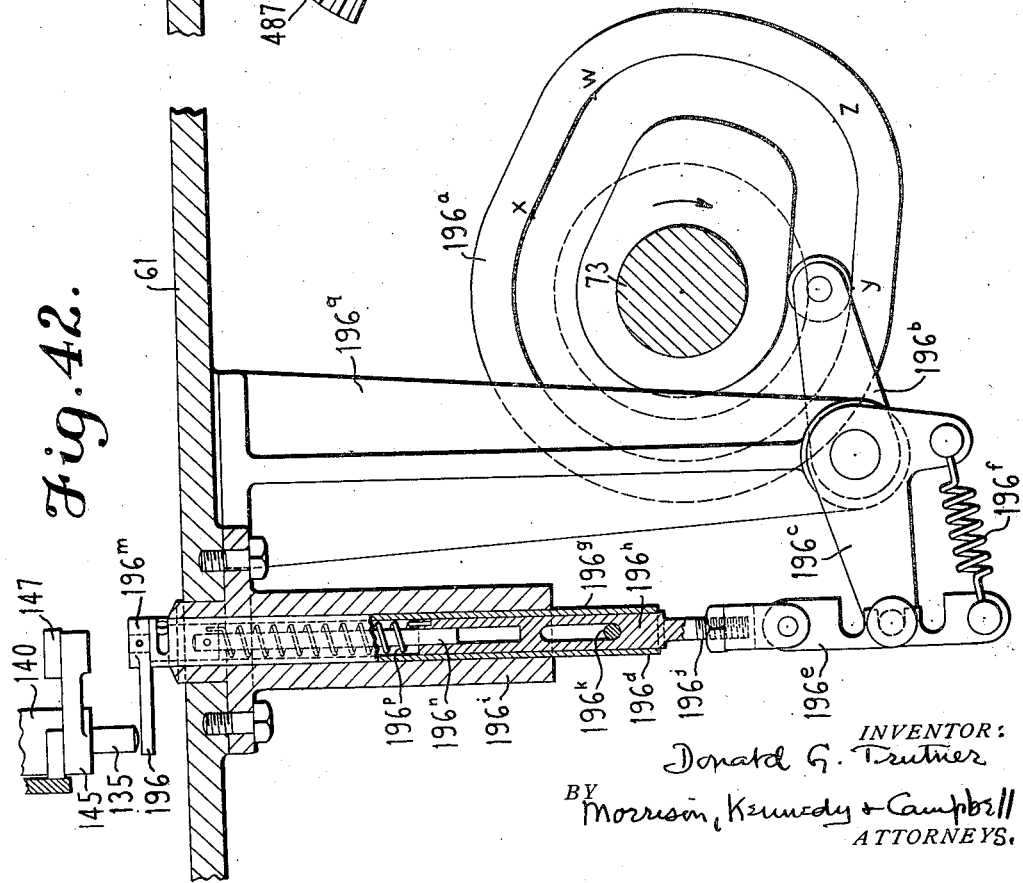

Fig. 42 is a vertical section view taken on the line 42—42 of Fig. 41. Fig. 43 is a vertical section view taken on the line 43—43 of Fig. 41.

Fig. 44 is a perspective view of the device for registering and bending the lower end of the exhaust pipe. Fig. 45 is a diagrammatic elevation of the operation thereon.

Fig. 46 is a rear elevation view of the device for perforating the flare portion of the stem, and Fig. 47 is a partial opposite or front elevation thereof. Fig. 48 is a perspective view thereof. Fig. 49 is a partial bottom view of Figs. 46—48; and Fig. 50 is a transverse section of the coupler block of Figs. 46—49.

Fig. 51 is a top plan view of the outfeeding or delivery mechanism. Fig. 52 is a partial similar view with the parts in a subsequent position. Fig. 53 is a partial similar view showing another stage of operation. Fig. 54 is a side elevation view of the delivery mechanism.

Figs. 55 to 63 are a series of diagrams showing the principal steps or operations in their preferred order. Fig. 55 shows the flare fed into position. Fig. 56 shows the cane fed to position beneath the flare, and the leadwires in place. Fig. 57 shows the exhaust pipe fed to offset position above the flare. Fig. 58 shows the heat-softening and bending of the pipe. Fig. 59 shows the relation of the three components before the lowering or longitudinal adjustment of two of them; and shows the longitudinal readjustment in dotted lines. Fig. 60 shows the step of heat-softening the flare and cane, and the fusing of the pipe to the flare. Fig. 61 shows the completion of the pinching or flattening operation. Fig. 62 shows the perforating operation by the blowing of air through the pipe while the flare wall is still soft. Fig. 63 shows the completed product or lamp stem, ready for the next step of lamp manufacture.

Stations and steps

The head stations are lettered $a$ to $y$, on radii through the head axes. The method steps are indicated in Figs. 55 to 63. At station $a$ the flare component A is fed to and held in the head with its flared end or skirt A' upward as in Fig. 55. The glass cane or rod B at station $c$ is fed beneath the flare as in Fig. 56. The leadwires C at station $d$, $e$ or $f$ are inserted through the flare and left projecting both above and below, but are omitted from Figs. 59–62. The exhaust pipe D at station $g$ is fed to the head and held at a vertical position offset from the axis of the flare as in Fig. 57. The lower end of the exhaust pipe is heat softened and during travel from $g$ to $h$ is bent at D' as in Fig. 58. The exhaust pipe between $h$ and $j$ is then swung into axial position above the cane and flare as in Fig. 59. The parts are then repositioned longitudinally, for example by thrusting downwardly the flare A at station $i$, and further downwardly the pipe D at station $j$, as indicated in dotted lines in Fig. 59. Heat is then applied to soften the lower end of the flare and to collapse it upon the enclosed top end of the cane as in Fig. 60. This heating is continued until the flare is fused and united both to the pipe D and to the cane B, while pinching or squeezing is performed at station $l$ and again at $q$, producing a fused connection E between the flare and cane, thus closing the lower end of the flare and embedding the leadwires; at the same time the flare and exhaust pipe being united by the fused connection F; all as shown in Fig. 61. Air pressure is next applied at station $s$ through the top end of the exhaust pipe, as seen in Fig. 62, while the fused connection F is still kept soft, thus blowing out the perforation G by which the exhaust pipe connects into the subsequently attached lamp bulb. The completed product H is shown in Fig. 63 looking at right angles to the position shown in Figs. 59 to 62. It is released from the several chucks at or between stations $v$, $w$ and $x$, and is delivered to outfeeding means at station $x$, station $y$ being an idle station preceding station $a$.

General machine parts

As best seen in Fig. 8, the machine may stand on legs 60 at the top of which is a horizontal frame member or table 61 of generally circular form, to the central part of which is attached a flanged sleeve 62 giving support to an interior vertical sleeve 63 which guides a vertically reciprocating rod 625 to be described. On top of the sleeve 63 is a fixed closing disk or cap 64 upon which certain parts are mounted. The rotary turret or carrier 67 stands up from an inwardly extending web 68 fitted to rotate on the frame table 61 and held down by the flange sleeve 62. The upper part of the turret extends outwardly to support the series of heads or units, and a cover piece or closing cap 69 is mounted centrally on the turret and extends inwardly adjacent to the fixed cap disk 64. The turret is thus firmly mounted for its rotary movement to carry each of the heads successively to the various operating positions or stations around the orbit of travel.

The turret is preferably advanced in step by step manner, pausing at certain stations for an appreciable time for certain operations, other operations being effected during or by reason of the advancing travel of the heads. A convenient intermittent drive means comprises downwardly extending studs or rollers 70 at the under side of the turret web 68, the successive studs being adapted to be engaged by a cam 71, its contour seen in Fig. 7; this being such as to advance the turret and series of heads by one space or step in each cycle. The step drive cam 71 is at the periphery of a cam wheel 72 mounted on a drive shaft 73 having suitable bearings in the machine frame. This drive shaft may be turned at relatively low speed, such as one turn in five seconds, by means of a worm wheel 74 on the shaft, engaged by a worm 75 on a power shaft 76, which latter is turned at high speed through belt pulleys 77 driven by a belt 78 from pulleys 79 on the shaft of a driving motor 80.

In addition to the horizontal drive shaft 73 there is shown a second horizontal drive shaft 83 at right angles thereto, the two geared together by equal bevel gears 82. These two shafts carry various cams and connecting devices for the operation of the mechanisms of the machine.

Means for supplying gas and air under pressure for heating and other purposes may be as follows. A series of brackets 88 outstanding from the frame table 61 gives support, by fixtures 89, to an upper or air supply duct 90 and a lower or gas supply duct 91. Each of these extends somewhat more than half way around the periphery of the table, the air duct having a supply duct 92 leading from a compressed air reservoir and the gas duct has a supply duct 93 from a suitable source. Around the air duct are a number of air valves 94 and around the gas duct a number of gas valves 95, with flexible or other air connections 96 and gas connections 97 to the various points of consumption. At most points these gas and air connections unite by a T or other fitting into a short flexible gas and air connection 98 leading to an arched fixed duct 99, which may be mounted upon the ducts 90, 91, and each extending substantially to the delivery nozzles or burners, both in front and to the rear of the stations whereat heating is to be performed. At other stations air only is supplied by connections 96 for different purposes, to perforate the product, to prevent collapse of flare or to cool the product.

Construction of head

Around the turret are shown twenty-five heads or units 100, adapted to advance in circular series, although there might be a greater or less number. Each head is adapted to receive the flare and other component elements of the lamp stem and hold them during the successive operations thereupon and positioning movements thereof until the completed product is delivered to the outfeeding mechanism.

Each head has a rearwardly projecting flange or base 101 by which it is adjustably attached to the turret, as shown on Fig. 8. Each of the heads is shown in Figs. 10–17 as formed with certain fixed parts rigid with the base 101, including right and left hollow columns 103 and 104, a cross piece 105 at the top, extensions 106 and 107 constituting slideways, on the tops of the respective columns, an upwardly extending bracket 108 having a forked end for separating or spacing the leadwires from the axis, frontwardly extending brackets 109 and 110 on the left column giving support to the swinging carriage that carries the cane chuck and the leadwire holder, and a downwardly extending bracket 111 on the left column with rear notches 112 affording a positioning and stopping means for the exhaust pipe swinging motion.

The head comprises holders or chucks for the flare, the cane, the leadwires and the exhaust pipe, all openable and closable and all swingable to and from the axis, with the exception of the flare chuck having a permanent axial position.

The flare chuck is shown as comprising right and left jaws 113 and 114 sliding respectively in the slideway extensions 106 and 107 at the tops of the two columns, each slideway having a removable top plate. The left jaw is shown as horizontally slotted forming upper and lower portions each engaging the flare by a V-shape notch, while the right jaw presenting a vertical engaging surface of the full depth of the left jaw and horizontally slotted; thus affording three pairs, or six points of contact and holding the flare vertical, but permitting it to be slid or readjusted downwardly at a certain later stage, until its lower end surrounds the cane. The right jaw 113 is at the inner end of a slide 115 sliding in the extension 106 and this slide is actuated by a pivotal connection from a rock lever 116. The lever 116 has a rear extension which operates through an adjustable link 117 to move a slide 118 that carries at its inner end the left jaw 114 and is slidable in the extension 107. The arms of the rock lever 116 are of unequal length, and so proportioned that the flare jaws will hold any diameter of flare, within their capacity, in alinement with the vertical axis. The jaws are thus movable in unison to approach and hold the flare at the axis of the head.

For the actuation of the flare jaws the rock lever 116 is mounted at the top of a vertical rock shaft 120 turning in the hollow column 103. A coil spring 121 engages the column and the shaft and exerts a pressure to close the flare chuck. For opening the chuck a rock lever 122 is mounted at the lower end of the shaft 120, and extends rearwardly to where it carries a roller 123 actuated by a cam 191 to be described.

The exhaust pipe chuck comprises a relatively fixed holding jaw 125 and a relatively movable jaw 126, Figs. 10 and 11. These and their supporting parts are mounted at the top of a rock sleeve 127 by a swinging carriage 128. The sleeve can adjust vertically by sliding in the left column 104, shown also in Fig. 14. The carriage 128 is adapted to swing to and from axial position, the jaw 125 being fixed to it, while the movable jaw 126 is mounted on a rock lever 130 fulcrumed on an extension of the carriage, the far end of the rock lever connected by a universal joint and link 131 to the top end of vertical rod 132 slidable within the sleeve 127. By this means the rise and fall of the rod causes the opening and closing of the chuck jaws. As shown in Fig. 14 the sleeve 127 carries an inner ring 133 forming an abutment for a coil spring 134 extending below the ring into contact with the enlarged foot 135 of the rod. The actual closing of the jaws upon the glass pipe therefore is effected by the action of the spring reenforced by gravity, while the opening of the jaws is effected by cams 195 and 196 to be described, operating upon the foot 135 of the rod to lift and let it down at proper intervals.

Vertical adjustment of carriage 128 and pipe chuck may be effected as follows. Near the lower end of the rock sleeve 127 is shown an upper collar 137 fast thereon, and below that a loose collar 138 having a finger 139 extending leftward and shown engaged in the lowermost notch 112 at the back side of the bracket 111, thus vertically positioning the rock sleeve and carriage. The entire rock sleeve and carriage mechanism may be lifted for engagement of the finger with other notches in the case of longer stems or exhaust pipes.

The pipe chuck and carriage may be swung as follows. Below the loose collar 138 is a collar 140 fast on the rock sleeve, this having an upper rock arm 141 extending leftward and carrying an adjustable contact screw 142 adapted to contact the bracket 111 and thus determine the normal axial or central position of the pipe chuck. An interior spring 143 tends to turn the rock sleeve to swing the contact 142 to the bracket 111 and thus swing the carriage 128 toward the center of the head. Below the arm 141 on collar 140 is a double rock arm 145 carrying at the left and right respectively cam rolls 146 and 147, by which the swinging of the carriage 128 is effected by a cam 194 to be described, operating to retract the chuck, opposed by the spring 143.

At the front side of the head 100 it carries a swinging or rocking carriage 150 which carries the chucks both for the cane and the leadwires, and swings them frontwardly for the infeed of the cane, and thereafter rearwardly to bring the cane to the general axis. The carriage 150 is mounted at the top end of a rock sleeve 151 which takes its bearing on a vertical rod 152 turning in the upper and lower head brackets 109 and 110. The rock sleeve carries a rock arm 153 at its lower end, just above the bracket 110, with a cam roll 154 at the extremity of the arm, operated by a cam 192 to be described to effect the bodily swinging movements of the carriage 150. Within the rock sleeve is a spring 155 opposing the cam and tending to swing the carriage inwardly.

As will appear the carriage 150 serves not only to hold and swing the cane to central position, but finally is utilized to swing outwardly and frontwardly the finished product H, held on the carriage by its cane after its other components have been released.

The free end of the swinging carriage 150 is formed with a cylindrical portion 156 affording a fulcrum for the movable jaws of the cane and leadwire chucks, and beyond that, at a slightly higher level, an extension block 157, best shown in Fig. 17, supporting the opposing or relatively fixed jaws.

Coming to the cane chuck, its fixed jaw 159 is mounted adjustably on the block 157, while the swinging jaw 160 is fulcrumed on pin 172 on top of the cylindrical portion 156. The swinging jaw is shown actuated by a short link 161 pivoted to a rock arm 162 extending from the top end of a rock shaft 163 mounted in ears projecting from the sleeve 151, with a spring 164 turning the shaft to close the jaw, and with a lower rock arm 165 below the lower ear, carrying at its extremity a cam roll 166 operated by a cam 193 to be described for opening and closing the cane jaws.

As stated, the swinging carriage 150 gives support not only to the cane chuck comprising the fixed and movable jaws 159 and 160, but also the leadwire chuck which comprises a fixed jaw 169 and a swinging jaw 170, these being located directly above the cane jaws. The movable jaw is pivoted on a vertical pin 172, which is also the pivot for the movable cane jaw below and extends below the cylindrical portion 156 of the carriage to give pivotal support to certain leadwire channel members to be described. The combined leadwire jaws enclose between them a circular aperture for the loose reception of the cane; the inserted leadwires being held substantially upright by the complementary jaw surfaces at either side of the circular aperture, and the top ends of the wires being spaced apart by the fixed fork 108 in the upper part of the head, also centrally apertured to accommodate the exhaust pipe.

The movable leadwire jaw 170 is actuated through a short link 173 connecting the jaw with a rock arm 174 which is mounted at the top end of the vertical pin or rock shaft 152 that extends down through the rock sleeve 151. Inside the sleeve is a spring 175 connected to the rock shaft tending always to rock it in a direction to close the leadwire chuck. To open the chuck a rock arm 176 is attached to the lower end of the shaft 152, below the bracket 110, and this rock arm carries a cam roll 177 cooperating with a cam 197 to be described whereby the movable leadwire jaw is retracted, against the spring.

After the cane chuck has received the cane, and the head has moved on to a new position, the leadwires are inserted manually adjacent to the fixed jaw 169, following which the movable jaw closes upon and holds the leadwires. It will be noticed that the fixed cane jaw 159 is formed with upright grooves 180, these being intended to hold the portions of leadwire extending down below the jaw level. These substantially upright grooves are continued therebelow in the form of channels 181 formed in a pair of channel pieces 182 carried upon a swinging block 183, the hub 184 of which is mounted on the pivot pin 172 below the carriage portion 156. In their normal position the channel pieces 182 are in alinement with and below the grooves 180, but this entire assemblage is adapted to yield resiliently at certain times against the resistance of a spring 185, the hub 184 having a stop pin 186 adapted to contact a stop screw 187 mounted at the underside of the carriage, to determine the alined position of the channel pieces. The yield prevents interference with the cane infeeding operation.

When the two leadwires are thrust down through the grooves 180 and into the channels 181 it is desirable to fix a definite limit to their inserted position. For this purpose each channel 181 is shown as containing a stop member or gage strip 188, secured in the channel at a vertically adjustable position by a set screw 189.

*Head operating cams*

In describing the head 100 there have been pointed out the contacts or cam followers by which the several chucks are opened and closed or swung outwardly or inwardly. Thus the flare chuck 113—114 is opened by roll 123 and allowed to close by a spring. The pipe chuck 125—126 is opened by the lifting of the foot or lower end 135 of the vertical actuating rod and allowed to close by gravity and spring and is swung outwardly or rearwardly by rolls 146 and 147 and allowed to close by a restoring spring. The carriage 150 which carries the chucks for the cane and leadwires is swung outwardly or frontwardly against a spring by cam roll 154. The cane chuck 159, 160 is opened by cam roll 166 against a restoring spring. The leadwire chuck 169, 170 is opened through cam roll 177 against a restoring spring. These six rolls or contacts are actuated by a system of cams best shown in Fig. 7, see also Fig. 8. In general these actuating cams are fixed and operate by reason of the indexing or advancing movement of the successive heads from station to station; the rolls riding on to the fixed cams for outswinging or for opening movements and riding off of these cams for their return inswinging or closing movements, although in some cases an active cam movement is arranged to occur while the head remains stationary at an infeeding or outfeeding station.

For convenience of description the twenty-five head stations have been lettered on the plan view Figs. 1 and 2 with the consecutive letters $a$, $b$, $c$ etc. to $y$, thus enabling the successive positions to be defined. The flare is fed in at position $a$, the cane at position $c$, the leadwires in the neighborhood of position $e$ and the exhaust pipe at position $g$; while toward the end between positions $v$ and $w$ the openings and swingings are effected for the outfeed at $x$ of the finished product H.

The head operating cams include, for the flare chuck, a fixed cam 191 adapted to engage the roll 123, this cam having an inclined starting end 191$^a$, causing the shift of the roll and the opening of the chuck; and the cam having a hinged finish end 191$^b$, actively shifted to allow the closing of the chuck. The swinging of the hinged end will be later described.

A cam 192 is shown cooperating with the roll 154 for swinging the carriage 150 and the cane chuck 159—160 thereon. This cam has an inclined starting end 192$^a$ effecting the outswinging of the carriage and chuck, and an inclined finish end 192$^b$ permitting inswinging thereof during travel.

Cam 193 is shown cooperating with roll 166 to open the cane chuck against its closing spring, and to permit its closing. Both of these movements should take place while the head is stationary; therefore the cam 193 has a hinged starting end 193ª and a hinged finish end 193ᵇ, both actively moved as will be described.

For swinging the exhaust pipe chuck a cam 194 is shown cooperating with the two rolls 146, 147, the use of two rolls giving a more accurate and easier motion. The cam 194 has an inclined starting end 194ª for retracting the pipe chuck and a finish end 194ᵇ for permitting it to swing inward to central position in the head during travel.

For opening and closing the exhaust pipe chuck, preferably two separate active cams are employed, each opening the chuck and promptly allowing its closing, thus dispensing with a continuous cam surface from one to the other. Thus near station or position w is shown a cam or contact bar 195 adapted to rise and lift the rod 135 to open the chuck and to descend to permit the closing of the chuck. The cam 195 may be operated from a rotary cam 195ª on the second drive shaft 83. The cam 195ª swings a rock lever 195ᵇ, this lever being connected by a vertical link 195ᶜ with a second rock lever 195ᵈ, the opposite end of which is connected by a vertical link 195ᵉ with a vertical rod 195ᶠ sliding in a vertical bearing 195ᵍ fixed on the frame table 61. Fig. 8 shows the cam 195 in its lowered position and in dotted lines in its lifted position. This is adjacent to station w so that the pipe chuck is open just before it is swung outwardly or rearwardly, thus disengaging the product. the cam allowing the closing of the chuck in its retracted position. The timing cam 195ª has a contour to give this actuation.

The second pipe chuck opening cam 196 is near station g. A suitably timed rotary cam 196ª is mounted on the drive shaft 73. Its groove is engaged by the extremity of a rock arm 196ᵇ carried on a short fulcrum shaft on bracket 196ᶜ which carries also a second rock arm 196ᵉ from which extends upwardly a rod 196ᵈ carrying at its top end the lifter cam 196. These parts are timed to open the pipe chuck to receive a pipe and allow it to close upon each pipe fed to it at station g.

Fig. 42 shows additional details of the lifter 196 for lifting the rod 135 to open the exhaust pipe chuck. A link 196ᵉ with three notches is held to a stud on the arm 196ᶜ by a spring 196ᶠ to assist adjustment of the rod 196ᵈ. This rod comprises a sleeve 196ᵍ and a plunger 196ʰ, the sleeve slidable in a fixed slideway 196ⁱ and the plunger having a swivel-screw connection 196ʲ to the link. The plunger is slotted and engaged by a cross-stud 196ᵏ of the sleeve. The cam or contact 196 is on a head 196ᵐ, to which is secured a long pin 196ⁿ slidable in the plunger. A spring 196ᵖ has its ends embedded in the head 196ᵐ and in the plunger and it surrounds the pin 196ⁿ. The spring is in endwise compression, to hold the normal relation of the parts, and its rotary yield permits the contact 196 to yield and avoid breakage if it should stand in the path of the rod 135. Rotary cam 196ª, as marked on Fig. 42, from w to x swings 196ᵇ to lower the lifter 196 and close the pipe chuck; from y to z it opens the chuck.

The leadwire chuck cam 197 is shown as a fixed cam acting on roll 177 and having an inclined starting end 197ª to open the chuck and a corresponding finish end 197ᵇ permitting the closing of the chuck, the cam having an idle or offset jog or bend 197ᶜ near the middle, to allow for and corresponding with the bodily inward swinging of the carriage 150 at this point, as the carriage supports the leadwire chuck as well as the cane chuck.

The actuation of the active cam portions 191ᵇ, 193ª and 193ᵇ, already described, may be effected from a timing cam 199 mounted on the second drive shaft 83. This actuating cam 199 has a peripheral groove with an offset portion. The cam operates to swing a rock arm 199ª mounted below the table at the lower end of a vertical rock shaft 199ᵇ which directly carries the cam section 191ᵇ, and which carries also a rock arm 199ᶜ through which the following actuations are effected. A link 199ᵈ extends from rock arm 199ᶜ to a rock arm 199ᵉ, seen also in Figs. 7 and 8, carried at the lower end of a vertical rock shaft 199ᶠ at the top of which is directly carried the cam part 193ª. From the rock arm 199ᶜ extends also a link 199ᵍ to a rock arm 199ʰ attached at the lower end of a vertical rock shaft 199ⁱ at the upper end of which is directly carried the cam part 193ᵇ. The three cam parts 193ª, 191ᵇ and 193ᵇ, operate respectively at stations w, a and c, in each cycle, while each carriage pauses at those stations.

As each head comes to or indexes at station a the chucks are all open, except the exhaust pipe chuck, and the carriage 150 and exhaust pipe chuck are in their outward positions. While pausing at station a the head receives a flare and the flare chuck closes. At position c the head receives a cane and the cane chuck closes, and it is next swung in with carriage 150 as the head travels from this station. At stations d, e or f the leadwires may be manually or otherwise inserted in the head, and beyond station f the leadwire chuck closes during travel. At station g the outswung exhaust pipechuck is opened, and after receiving a pipe, is again closed at this station; its swinging in to its axial position occurs during travel from station h to or beyond station i. The chucks are not further actuated until approaching station w, when the releasing operations may take place in substantially the following order. The flare chuck is opened by its cam 191. The product has been completed and is to be outfed by its cane element. About the same time with the release by the flare chuck the exhaust pipe chuck is opened by cam 195, and is retracted outwardly to the rear by cam 194, and immediately allowed to close. The leadwire chuck is opened by cam 197. The completed stem is thus released in every way except that it is held by its cane in the cane chuck; and the latter with carriage 150 is now swung outwardly to the front by the cam 192, during travel between station w and station x. At the outfeeding station x the cam part 193ª operates to open the cane chuck as the product is taken in charge by the outfeeding mechanism to be described.

Flare infeeding mechanism

The flare infeeding mechanism appears in front of station a in Fig. 1; certain actuating parts are shown in Fig. 7 and the details are elaborated in Figs. 18 to 28. In general the mechanism comprises a reservoir or hopper 200 from which the flares are fed in succession by a pick-up wheel 201 and caused to travel along a slanting chute or track 202, from the foot of which they are transferred by a member 203 in succession to the open flare chucks of the successive heads, each such chuck immediately closing, as already described, and the transfer member retracting, before the head moves on to the next station. Each flare is thus positioned in a head in proper relation to the positions to which the other elements of the lamp stem are to be fed into the head; and the presence of each flare controls the infeeding of the cane and exhaust pipe thereto.

Extending frontwardly from the frame table 61 is a table extension 204 upon which stands upwardly a bracket 205 carrying a generally semi-circular frame wall 206, which bracket and wall give support to the hopper, the chute and the transfer member.

The hopper 200 is a box having its right hand wall 207 attached to the frame wall 206 and having its bottom wall 208 and rear end wall 209 sloping convergingly to a bottom line which slopes downwardly to the right so that the glass flares, loose in the hopper, trend always to the lowest point, from which they are outfed to the chute. Attached inside the end wall 209 is a concave shelf 210 by which are returned safely to the left side of the hopper the flares which have been picked up by the wheel but not outfed. The hopper is completed by its left side wall 211.

Adjacent to the right wall of the hopper, and mounted on the supporting wall 206 is the pick-up wheel 201, rotated preferably intermittently but always in one direction. This feed wheel may be between two similar hoppers, both feeding to its pick-up members ascending in the center, the wheel driven from its periphery, but a single hopper is shown for illustration.

The pick-up wheel is shown as built up of a closed outer or right circular wall 213, with a peripheral wall or rim 214, and at each side of its interior space an apertured wall, 215 at the hopper side and 216 at the other or outer side. The two walls 215 and 216 are each formed with four apertures as best seen in Figs. 23 and 24; and these walls at the lower sides of their apertures form a pair of tracks 217 adapted to pick up, from the lowest point or apex of the hopper, one or more flares, the flare skirts overlying the tracks 217, and their shanks hanging down between the walls 215 and 216. As each pair of tracks rises into the hopper a small number of flares move into the aperture, and as the pick-up wheel rotates, counterclockwise in Figs. 23 and 24, one or more of the flares will usually adjust themselves dependingly on the tracks as described, to be delivered later from the tracks to the fixed chute to be described.

For rotating the pick-up wheel it is shown as attached to a gear 219 which in turn is attached to a flat ring 220, constructed in sections or halves, and set into a groove 221 in a fixed hollow hub 222 extending horizontally inwards from the fixed wall 206 and forming the bearing for the pick-up wheel and gear. As shown in perspective in Fig. 20 the hollow hub 222 is formed with an opening 223 at the point where the flares are to slide down by gravity from the tracks 217, through the opening or door 223 and on to the tracks 227 of the chute.

Back of the hopper the pick-up wheel is enclosed at its left side by a fixed plate or wall 224, preventing the exit of any flares which may have been carried around. Adjacent to the position wherein the flares are to leave the pick-up wheel tracks and pass through the door 223 there is shown a nozzle 226 arranged to deliver an air jet for the purpose of agitating or readjusting any flares that may not have taken their correct position between the tracks 217. Any flares that do not properly feed through from the track 217 to the chute beyond will be returned to the shelf 210 and thus delivered back into the hopper.

The fixed chute 202 is composed of opposite tracks 227 and these commence at the opening or door 223 of the fixed hub 222, as shown in Figs. 20 and 23–25. The top ends of these chute tracks aline with the lower ends of the feed wheel tracks 217 when the latter are in their inclined delivery position as seen in Figs. 23 and 24. From this point the chute tracks take a curved path and extend diagonally and downwardly through the hollow interior of the hub 222, as shown in Fig. 25, thence curving again and extending straightly at a downward slant substantially to the delivery end of the chute. The chute tracks 227 are attached at their upper ends by a clip 228 to the wall 206 and near their lower ends are similarly attached by a clip 229 to a rearwardly extending bracket 230 mounted at the rear side of the wall 206. Incidentally the clip 229 may carry a small gas burner 231 to warm up the flares preliminary to being transferred into the hot flare chuck of the head.

Near its lower end the chute curves somewhat to the left, and at the end the left track is curved around to the right, see Fig. 22, forming a chute end 232, and thereby providing a chute exit which is directed at a rightward incline to cooperate with the transfer means. The right track has attached to it a gate block 233 on which is pivoted a gate 234, normally extending across the chute exit, as shown in Fig. 21 and restraining delivery of flares. The gate 234 is mounted at the lower end of a short vertical shaft surrounded by a spring 235 tending to close the gate, and at the top of the shaft is an opening finger 236. When the finger is displaced rightward the gate opens and a flare may be fed out and transferred. The opening of the gate may be variously effected, for example by connection from rack 246, in proper time, but for illustration is shown performed by a part of the transfer device as will be described.

The transfer device 203 is shown as comprising a lower transfer member or segment 238, above which is a second similar segment 239 serving to push upon the finger 236 to open the gate and acting as a guard to hold the foremost flare down. The transfer segment 238 is formed with a recess 240 adapted to engage the shank of the foremost flare, and with a somewhat lengthened horn or separator 241 adapted to enter between the foremost flare and the next succeeding one, thus preventing the delivery in one cycle of more than a single flare. The segments are mounted at the lower end of an upright shaft 243, the shaft being rocked from its upper end as will be described to swing the transferrer to and fro. As seen in Fig. 21 the transferrer is about to advance, engage the foremost flare, cause the opening of the gate, and deliver the flare out of the chute and across the space between the chute and the chuck 113, 114, which stands open ready to receive the flare, the chuck thereupon closing as shown in Fig. 22, and the transferrer retracting to the Fig. 21 position.

For oscillating the transferrer the rock shaft 243 extends upwardly through the bracket 230 and through a block 244 thereabove. The shaft carries a pinion 245 engaging a rack 246 sliding through the block, so that the reciprocation of the rack will oscillate the segment. The actuating connections may be traced back to the second drive shaft 83 as follows. The sliding rack 246 is connected by a link 247 with a rock arm 248 attached to the upper end of a rock shaft 249 that extends downwardly to the actuating connections. However, above the frame table is a manual clutch or coupling to permit disconnection at will. Thus at the foot of the shaft 249 is shown a coupling member 250 engaging a lower coupling member 251, with a pin 252 to couple and uncouple these members, the lower coupling member being attached to a shaft 253 which normally is a continuation of shaft 249. When the pin is lifted at will the feeding of flares ceases.

Below the table the rock shaft 253 is provided with a rock arm 254, its free end carrying a roll engaging in the groove of a cam 255 mounted on the drive shaft 83. As the shaft 83 runs continuously the transfer segment will oscillate continuously, with one advance and return movement for each cycle or rotation of the shaft, unless the connections are uncoupled by the pin 252.

The pick-up wheel 201 may be rotated intermittently in one direction through its gear 219. As seen in Fig. 18 this gear is engaged by a pinion 257, the teeth of which are interrupted by a toothless section 258 engaging toothless sections 259 on the gear. The gear is divided into four sections, each having a toothed section and a toothless section corresponding to the pinion so that the gear will be turned a quarter revolution and brought to rest in each cycle, the position of rest corresponding with that shown in Figs. 23 and 24 where the tracks 217 are in alinement with the chute tracks 227. This intermittent operation of the pick-up wheel, always in one direction, causes flares to be supplied to the chute, but as will be described this operation, whenever the chute is partially filled, will be suspended to prevent clogging of flares at the pick-up wheel and to save unnecessary tumbling and possible injury to the flares in the hopper.

The driving connections for the pinion 257 comprise a bevel gear 260 on the same shaft therewith, this meshing with a bevel gear 261 on a vertical shaft 262, the lower end of which carries a bevel gear 263 engaged by a bevel gear 264 on a horizontal shaft 265 carrying at its other end a bevel gear 266 and turning in fixed bearings 267. The bevel gear 266 engages a bevel gear 269 attached to a sleeve 270 loose on a reduced portion of the shaft 83. Surrounding and attached to the sleeve 270 is an exterior or clutch sleeve 271. This assemblage is confined on the shaft 83 by a shaft bearing 272 at one end, see Fig. 28, and a flanged collar 273 attached to the shaft. The collar 273 has a hole 274 to receive a coupling pin 275 for clutching together the shaft and the sleeve, thus rotating the bevel gear 269 and connected train. The clutch pin is pressed upon by a spring 276 tending to engage the parts as shown in Fig. 28, while disengagement is effected through a dog 277 attached to one end of the pin and projecting radially outward within reach of the unclutching devices.

The uncoupling of the clutch 274, 275 may be effected by retracting the dog 277 by the following or similar devices, mounted upon a depending bracket 278. An unclutching cam or dog 279 is attached to the under side of a swinging lever 280 pivoted to the bracket in position to coact with the dog 277. A spring 281 is arranged to lift the lever and render the cam inoperative. The free end of the lever is shown connected by a link 282 with a small rocker 283 of triangular shape pivoted at 283ª on a bracket 284. With this rocker cooperates a latch 285 maintained normally by a spring in the position shown in Fig. 26 abutting against a pin 284ª on the bracket 284, whereat it holds the rocker and prevents rise of the lever 280. The latch is pivoted at 285ª on the bracket, and on the same pivot is an arm 286 carrying a pin 286ª by which the latch may be swung against the pull of its spring. The action is indicated by the dotted lines in Fig. 26. When the arm 286 is swung down the pin 286ª swings the latch 285 up at its far or latching end, thus releasing the rocker 283 and permitting it to swing to its dotted line position, so that the spring 281 can lift the lever 280 and the unclutching cam 279, which releases the dog 277 and permits the clutch to engage and the flare feeding operations to continue. When the chute is sufficiently full of flares this operates to allow latch 285 to return and latch down the cam lever 280, so that at the end of the cycle the clutch will be again opened.

The swinging of the arm 286 for these purposes is shown effected by a long vertical connecting rod 287 which is constantly pulled downwardly by a spring 287ª. At its top end the connecting rod 287 is pivoted to a portion of a rock arm 288 fulcrumed on the wall 206. This rock arm is formed as a fork engaging a grooved head 289 of a sliding rod 290 which at its lower end carries a feeler 291. This system 287—291 is adapted to be lifted in each cycle, and when lowered the presence of flares in the chute 202 restricts the descent, this constituting the detecting action by which, when the flares are in plentiful supply in the chute, the feeding of further flares from the hopper by the pick-up wheel is suspended. The rock arm 288 swings about an axle 288ª and may be lifted against the spring 287ª by means of a second rock arm 292. The latter carries an adjustable contact 292ª by which it may lift the rock arm 288, and may lower it as far as permitted by the presence or absence of flares in the chute. A link 293 is shown connecting the lower end of the arm 292 with the right extremity of a rock arm 294 projecting from the vertical rock shaft 249 which effects the oscillation of the transferring segment.

By this arrangement the arm 292 is constantly rocked. If there are no flares, or very few flares in the chute, the rock arm 288 will be constantly oscillated through its full amplitude. On each descent the long connecting rod 287 will swing the latch 285 into unlatched position, shown in dotted lines in Fig. 26, so that the spring 281 will act to lift the lever 280 and remove the cam 279 from the path of the clutch dog 277, thus permitting the pick-up wheel rotating connections to continue steadily in operation. When however the chute is filled with flares up to the feeler 291 the latter will come down upon the flares as shown in Fig. 19, preventing the lowering of the rod 287 and thereby maintaining latched the rocker 285 and preventing the rising of the clutch controlling lever 280, with the consequence that at the end of the current rotation the clutch will be opened and the pick-up wheel will come to rest and remain at rest until again put into operation when enough flares have been drawn from the chute to allow the full descent of the feeler.

To complete this operation it is necessary in each cycle to effect the descent of the lever 280 so as to reset the lever and rocker in the position shown in Fig. 26. For this purpose a rock lever 296 is mounted on a fixed bracket 295, Figs. 26 and 27, one arm carrying a roll 298 acted upon by a cam 297 on the shaft 265, the other end carrying an adjustable contact 299, which contact at the proper point in each cycle, as determined by the cam 297, is lowered from the position shown in Figs. 26 and 27 in a manner to depress a contact 280ª at the extremity of lever 280, thus forcing the lever down to its lowered position, resetting the rocker 283, and permitting the latch 285 to resume latching position if the chute is sufficiently supplied with flares.

The flare infeeding mechanism thus performs its function of automatically feeding a succession of flares from a loose supply and singly transferring them into the successive flare chucks of the heads 100 at station a.

*Cane infeeding mechanism*

The cane infeeding mechanism supplies the glass canes or rods B one at a time and transfers them to the cane chuck 159, 160 of the successive heads, the mechanism setting each cane upright and placing it within the chuck at each head at station c while the head pauses there, the chuck thereupon closing upon the cane. The mechanism comprises an inclined hopper 300 from which canes are extracted one at a time by an inclined, kerfed feedwheel 301 which rotates leftward bringing the successive canes to a lowered position, whereat a transfer device or gripper 302, having opposing members or jaws in the nature of a thumb and finger, picks each cane from the wheel, tilts it upright and swings it across into the cane chuck of the head. These elements are mounted on a frame table extension 304 which appears in Figs. 1 and 7; the details of the mechanism being disclosed in Figs. 29 to 36.

The table extension 304 carries above it a left standard 305 inclining frontwardly and a right standard 306. The left standard carries a rearwardly projecting bracket 307 on which is mounted the feeler 342 for detecting the presence of a flare in the chuck. At the upper part of the left standard 305 is adjustably fixed a plate 309, see Fig. 29, carrying at its rear the hopper 300 comprising its casing 310 and inserted therein a detachable magazine 311. The adjustment of plate 309 allows resetting for different lengths or shapes of canes.

This entire hopper system stands at a frontward slant so that the canes B in the magazine feed downwardly and rearwardly by gravity to where they are engaged by the feed-wheel 301. The magazine has a slidable cover 312 which may be removed for refilling, and inside is provided with a weight 313 mounted at the lower end of a guiding stem 314, the weight bearing down upon the stack of canes and assisting their downward feed. The magazine may have a bottom 315 which however must be removed when the magazine is inserted, the bottom being shown in Fig. 29 as extracted, so that the canes may pass downwardly from the magazine into the lower part of the hopper rising to rest in axial direction upon the rim of the feed-wheel 301.

The feedwheel 301 is a large disk formed with a series of cane receiving peripheral kerfs or grooves 317 extending parallel to the axis. The wheel is thinner than the length of the cane, so that the cane may project both at the rear and front sides, as seen in Figs. 29, 35 and 36. The periphery of the wheel is also formed with a circumferential groove 318 to receive a spring retaining finger 324 to be described.

The feedwheel is mounted on a shaft 320 in a position slightly below the magazine 300 so that as the wheel indexes or rotates step by step, clockwise in the rear view Fig. 31, each of its kerfs 317 may receive from the hopper a cane and carry it around and down to the point where the transfer device takes hold of the cane for transferring it to the head. The shaft 320 turns in a fixed bearing 321 formed on the standard 305. At the rear or open side of the hopper is adjustably mounted a curved bridge plate 322 forming a semicircular guide around the periphery of which the upper ends of the canes may ride from the hopper as the wheel intermittently advances. When long canes are used this may be set well out from the wheel. The left side of the hopper is extended in the form of a guard wall 323 confining the advancing canes in the grooves 317 against accidental displacement. The guard wall 323 continues substantially to the lowest point of travel of the feedwheel, and beyond this point the wall is replaced by a swingable guard or finger 324 held lightly in place by a spring 325 and mounted on a special bracket 326. The finger 324 thus holds the most advanced cane in the wheel groove at the position wherein the transfer device is to remove the cane, the finger yielding easily by the pressure of the cane in the act of removing the latter from the feedwheel.

The feedwheel is indexed or advanced step by step, for example by the following mechanism, see Figs. 29 and 31. Mounted loosely on the shaft 320 is an oscillating triangular plate 327 carrying a pawl 328 pressed by a spring 329 into contact with a ratchet 331 fast on the shaft. The oscillation of the pawl carrier or plate 327 thereby causes the shaft and feedwheel to advance as described, one step or kerf-space in each cycle. A back pawl 332, depressed by a spring 333, overlies the ratchet and prevents accidental back movement.

Means are provided to prevent the feed of a cane to the turret head when a flare has not been fed to that head. This control means operates by preventing the indexing or advance movement of the feedwheel for the supply of a cane to the head from which the flare is missing. The following connections are shown to effect this purpose. Adjacent to the ratchet 331 is a cam plate 335 having a rightwardly projecting rock arm 336 by which the cam may be rocked into position to prevent the pawl 328 from engaging the ratchet, as indicated in Fig. 31. When the flare is missing the cam holds down the pawl, away from the ratchet, so that the rocking of the pawl carrier fails to advance the feedwheel. The rock arm 336 is shown as operated by a link 337 which extends at a downward rearward slant, at right angles to the shaft 320. A spring 338 is shown tending always to lift the link and shift the cam into non-feeding position. At its lower end the link is shown connected to a curved bell crank lever 339 which extends rearwardly and is loosely pivoted upon an axle 340, which serves also as a rock shaft for other purposes; the upward arm of the bell crank being adjustably connected by a long link 341 with a feeler 342 in the shape of a light rocker or triangular plate pivoted upon the extremity of the bracket 307. The feeler 342 is at the level of the flare in the head, below the flare chuck, so that when a head comes to station c properly containing a flare the flare will contact and swing frontwardly the feeler and thereby operate the described train of connections to shift the cam 335 to a position which allows the pawl 328 to engage the ratchet and thus advance the feedwheel, supplying a cane to the transfer device.

The feeding actuation of the pawl is effected through a link 344 connected to the pawl carrier 327, this link extending at a downward slant to the front end of a rock arm 345 fast upon the rock shaft 340. From the rock shaft extends downwardly a rock arm 36, the lower end of which has a universal connection with the arm part of the strap 347 of an eccentric 348 which in each cycle gives a complete oscillation of the cane feed pawl. The eccentric is mounted fast on a rock sleeve 394 to be described. In order to impose a braking effect upon the rocking of the rock sleeve, for purposes to be described, the eccentric strap 347 is shown as formed like a brake band, as seen in Fig. 30, with its extensions or ears drawn together by the pressure of a spring 349. The sleeve and eccentric surround and are operated as will be described from a vertical rock shaft 350, which indeed supplies the actuation for substantially all of the motions of the feed-wheel and transferrer.

The rocking of the vertical operating shaft 350 may be through the following connections, best shown in Figs. 33 and 34. At the foot of the shaft, below table 304, is a pinion 351 oscillated by a segment rack 352 constituting an arm of a rock lever fulcrumed at 353 and having an extension arm 354 which in turn is rocked by a link 355 connected with the upper end of a rock arm 366, which is fulcrumed at the lower end of a bracket 367 below the frame table 61, and is connected to a rock arm 368 carrying at its free end a follower or roll 369 engaging in the groove of a cam 370 mounted on the drive shaft 83. The cam is indicated as formed with operative portions ab, bc, cd, de and ea effecting a particular order and degree of oscillation of the shaft 350 for the actuation of the transfer device, as will be described.

The transfer device 302 is shown as comprising an upper jaw or finger 375 and a lower jaw or thumb 376, engaging the ends of the cane and holding it endwise between them as between the first finger and thumb of the hand. Each jaw has a recessed contact portion for engaging the respective ends of the cane, see Figs. 32 and 36, the recess of the thumb member being carried to the edge thereof to form an outlet for the swinging disengagement of the member from the cane. It should be explained that the canes advanced in the feedwheel have their front lower ends nearly flush with the front or closed side of the wheel and their rear upper ends projecting considerably as seen in Fig. 29; whereas when the transfer finger 375 engages the cane, as seen in Fig. 36, it pushes the cane, sliding it through the wheel groove into engagement in the recess of the thumb 376.

The finger and thumb are carried on a rocking member or handpiece 377 of irregular shape. The finger 375 is pivotally mounted directly upon the handpiece 377. At its underside the handpiece has two projecting studs 378 on which is adjustably mounted a slotted block 379 pivotally carrying the thumb 376. A screw 380 tightens the adjusted block on the studs. A spring 381, extending from a portion of the handpiece to a portion of the finger 375, tends to pull said finger into closed position, this motion being limited by a stop screw 382 on a portion of the finger. The thumb 376 is swung by a spring 883, its operative position being determined by a stop 384. The opening of the transfer device is effected by pressing upon the contact screw 382 of the finger as will be described. The yielding of the thumb 376 is merely for the purpose of permitting it to yield to pass by certain parts of each head of the turret when the transfer device is returning from the head to the feedwheel.

The entire described transfer device comprising the handpiece 377 and the finger and thumb members thereon is arranged to engage and take hold of each cane at the lowest point of the feedwheel travel, as shown in Figs. 31 and 32, and thereafter to tilt bodily by a wrist motion to swing the cane and snap it out of the feedwheel and into a vertical position, whereupon the device is swung bodily with an elbow motion from the feedwheel around rearwardly to the cane chuck in the head. The wrist motion of the handpiece 377 is effected by its mounting upon a rocking sleeve or wrist 385. Within the sleeve is a sliding stop pin or pusher 386 cooperating with the stop screw 382 on the finger 375, so that by sliding the pusher the finger can be swung upwardly to open the transfer device. These parts are mounted within a bearing 387 formed on top of an oscillating headpiece 393 to be described. The sleeve 385 is provided with a rock arm 388 adjacent the bearing 387, this rock arm itself having a stop screw 389 contacting the headpiece 393 to determine the inclined position of the transfer device as shown in Figs. 31 and 32 whereat it can engage a cane in the feedwheel. A spring 390 pulls upon the rock arm 388 to bring it to said stopped position, the spring being mounted upon a special bracket 391 as shown in Fig. 29, upstanding from headpiece 393.

Coming now to the oscillating headpiece 393, this is fixed to the top end of a rocksleeve 394 already mentioned, this sleeve surrounding loosely the vertical operating rockshaft 350. The shaft is arranged to operate the sleeve, not directly, but with lost motion, as illustrated in Figs. 29 and 30. Attached to the shaft below the eccentric 348 is a collar 396 from which project front and rear lugs containing respectively a front contact screw 397 and a rear screw 398. These screws are adapted to contact alternately upon a pin 399 extending downwardly from the eccentric 348. The contact screws 397 and 398 and the pin 399 are so spaced and arranged that on each oscillation of the shaft 350 the first part of its motion does not rock the eccentric and the sleeve and headpiece 393 carried thereby, other actions occurring, but the contacting of each screw with the pin commencing the rocking motion of said parts. In other words the shaft 350 has a considerably greater angle of oscillation than has the sleeve 394, each shaft motion commencing with loose play, until the clearance between pin 99 and one of the contact screws is taken up, and being then followed by the oscillation of the sleeve and the headpiece 393 carried thereon for the balance of the throw. This oscillation of the headpiece operates to swing bodily the transfer thumb and finger from the feedwheel, as seen in Figs. 31 and 32, through about 90°, around to the head, as seen in Fig. 1, and return. The loose motion of the shaft in advance of each swinging of the headpiece is utilized for the opening or closing of the transfer device, that is the swinging up or down of the finger 375. This operation is effected by a cam 400 operated from or mounted at the top of the shaft 350, this cam being in the form of a circular disk with a flattened side as best seen in Fig. 32, and being arranged above the headpiece 393 and in line with one end of the sliding pusher or pin 386, the other end of which pin cooperates with the contact screw 382 of the swinging finger 375. As will be clear from Fig. 32 when the shaft 350 started oscillating clockwise, the first action was that the cam 400 allowed the retraction of the pin 386 and thus the swinging of the finger 375 to close the transfer device on the cane in the feedwheel. The parts are shown in this position. The continued oscillation of the shaft will carry with it the sleeve and the headpiece, thus bodily swinging the transfer device around from the feedwheel to the turret head, the termination of this motion being adjusted by the contact screw 397. Upon the reverse motion of the shaft the pin 386 is first thrust by the cam 400 to open the transfer device, followed by its bodily swinging back to the feedwheel, the limit of this swing being adjusted by the contact screw 398.

The tilting or wrist motion by which the device and cane are tilted from a slanting to a vertical position as the cane is taken from the feedwheel and the reverse tilt of the device may be effected as follows. A contact screw 402 is shown mounted on an arm 403 pivoted at 404, frontward of and cooperating with a contact extension or lug 401 upstanding from the tilting handpiece 377. The cooperation is such that when the transfer device is swung to place under the feedwheel the lug 401 will contact the stop screw 402; the relative thrust rocking the lug and thus effecting the rotation of the handpiece 377 and the tilting of the transfer device into proper relation with the cane in the feedwheel. This tilting movement is resisted by the spring 390 which is tending always to swing the transfer device and cane into upright position.

Preferably at the completion of the swinging of the transfer device into cane-receiving position the tilting of the device is completed by a positive thrust of the contact screw 402 against the lug 401, namely by the rocking of the arm 403 which carries the contact screw. For this purpose the arm is rockingly mounted on the axle 404 as stated, and rearward thereof the arm has an extension rock arm 405, the extremity of which is formed with an incline acting as a cam and cooperating with a roller 406 mounted at the top side of the eccentric 348. By this arrangement as the sleeve 394 with the eccentric and the headpiece 393 complete their rocking motion the roller 406 rides on the arm 405 and thus throws down the arm and rocks rearwardly the arm 403 and contact screw 402 to complete the tilting motion of the handpiece 377 and jaws 375–376. The return motion of the arm 403 is shown as limited by a stop screw 407 mounted on a fixed bracket 408 which extends frontwardly from the standard 306 and constitutes also one of the brackets for supporting the rock shaft 310.

In each cycle therefore the cane infeeding mechanism is operated from the shaft 350 to take the foremost cane from the feedwheel, at about a 30° slant from the horizontal, snap it out of the feedwheel while tilting it upright, and swing it through about 90° from the feedwheel over to the turret head. The control cam 400 on the top of the shaft effects the following timed operations. As shown the transfer device has closed upon a cane at the feedwheel. From point *a* to *b* of the cam it effects the swinging of the device and cane from the feedwheel to the turret head. From *b* to *c* there is no swinging, but the shaft rocks the other way and jaws are opened, that is, the finger 375 rises, releasing the cane, after the latter has been gripped by the cane chuck. From *c* to *d* the device rests idly near the turret head, although obviously it might promptly commence its return swing. From *d* to *e* the device is swung back to the feedwheel, the jaws being open. From *e* to *a* the jaws close upon the next cane, the device having been tilted or twisted by a wrist motion into proper relation to the cane.

Leadwire infeeding

A supply of leadwires is contained in a receptacle or cup 420 attached by a bracket 421 to the front of the frame table betwen stations *e* and *f*. An operative is readily able to extract manually from the cup two wires for each head of the turret and to insert these between the open feedwire chuck jaws 169 and 170 and down into the channels 181 until contacting the gage plates 188 therein. This can be done either at station *d*, *e* or *f*. As the head travels from station *f* the chuck closes and holds the leadwires in proper relation to the flare and cane during fusing and pinching.

Exhaust pipe infeeding mechanism

This in general is analogous to the cane infeeding mechanism, having an inclined hopper 430 supplying the successive pipes to an inclined feedwheel 431 from which the glass pipes are taken and transferred by a gripper device 432 to the open pipe chuck 125, 126 on the turret head, at station *g*, the chuck having been previously swung outwardly to its rearward position, toward the center of the machine. In the extraction of each pipe from the feedwheel by its gripper it is snapped out of the wheel and tilted from its inclined to an upright position so as to be received properly in the pipe chuck, the transfer device then being swung from the hopper rearwardly to the chuck, during which movement it is slightly lifted and again lowered to clear the high point of the advancing turret head. These elements are mounted on a frame table extension 434.

Above the extension table 434 are certain fixed frame parts including upright standard 435 on which are supported many parts of the feeding mechanism. At its rear side standard 435 carries a bracket 436 for the support of a feeler to be described, for detecting the presence of a flare to control the feed of the pipe thereto. At the front of the standard is an upright bracket 437 carrying at its top a fixed shelf 438, and upon the shelf 438 is mounted an inclined bracket 439 which supports both the hopper and the feedwheel, and constitutes the front or under wall of the hopper.

The hopper 430 is enclosed at the front by the upper part of the bracket 439 and by left and right side walls 441 and 442, the rear upper side of the hopper being open for the manual insertion of a supply of pipes. At the bottom of the wall 442 is a wall extension 443 reaching in to the periphery of the feed wheel. The opposite side wall 441 has attached below it a guard wall 444 which curves around and down close to the wheel to prevent the pipes falling out. Within the hopper is a weight 446 resting on the pipes to assist their descent from the hopper to the wheel, this weight being mounted at the foot of a stem 447 sliding in a fixed guide 448. Preferably a curved guide plate 450 is used, bridging across the face of the feedwheel and held adjustably in place by legs 451 at its sides, this guide giving support to the projecting rear ends of the pipes, as seen in Figs. 37 and 38. In the case of longer pipes the bridge guide 450 can be set further out from the wheel.

The feedwheel is formed with a number of axially arranged feed grooves 454 adapted to receive pipes singly from the hopper and carry them around, counterclockwise in Fig. 38, and down to the place of delivery to the transfer mechanism, the wheel being indexed or advanced step by step to bring each groove and pipe to the lowest point, where it can be engaged by the gripper of the transfer device.

The feedwheel also has a circumferential groove 455, adapted, at the lower side of the wheel, to receive a spring finger 456 shown in Figs. 38, 39 and 40, this being mounted on a shank 457 turning in a bracket 458, with a spring 459 interconnecting the shank and bracket and acting to hold the finger yieldingly in the wheel groove, beyond the terminus of the guard wall 444. This finger operates to hold yieldingly in the wheel groove the most advanced pipe, the finger yielding as the transfer gripper swings the pipe out of the wheel into vertical position.

The feedwheel shaft 461 turns in the bracket 439 as a bearing and at its front or lower end is provided with pawl and ratchet mechanism for advancing it step by step. Thus a ratchet 462 is shown fast on the shaft. This ratchet is engaged by a driving pawl 463, see Fig. 38, pivoted to an oscillating carrier or plate 464 loose on the shaft, while a second or idler pawl 465 engages the ratchet to prevent back movement.

The connections for oscillating the pawl carrier 464, thereby to advance the feedwheel step by step is shown as comprising a link 467 extending downwardly to where it is pivotally connected to a rock arm 468 extending frontwardly from a long rock shaft 469 which extends through the shelf 438 as a bearing, see Fig. 41. At its left end the rock shaft 469 carries a downwardly extending rock arm 470, see Fig. 37. This arm is rocked by the extended arm or strap 471 of an eccentric 472. By this arrangement the turning of the eccentric operates the train of mechanism to oscillate the driving pawl. To serve as a brake for purposes to be described the strap is shown as closed tightly on the eccentric by spring 473, thus tending to hold the eccentric from turning but permitting it to slip during operation.

Continuing the train of connections for oscillating the pawl 463, the eccentric 472 is shown mounted fast upon a rocking sleeve 475. This sleeve is loose upon an operating rock shaft 476. These parts turn about a vertical axis and take their upper bearings in the shelf 438 and their lower bearings in the standard 435. The operating connection between the rock shaft 476 and the sleeve 475 may be as follows. Projecting downwardly from the under side of the eccentric 472 is a contact pin 477. Mounted on the rock shaft just below the eccentric is a collar 478 having a first lug and screw contact 479 and a second screw contact 480, adapted in turn to contact the pin 477, so that the rock shaft may rock the eccentric and sleeve, but with substantial lost motion, due to the spacing of the contacts that act on the pin 477. The rock shaft 476 has to perform other functions and during the first part of each rocking motion it does not act upon the eccentric and sleeve, these remaining idle until one or the other of the screw contacts meets the pin 477, thereafter the eccentric and sleeve rocking with the shaft. The first or relative movement causes the opening and closing of the gripper, the second or joint movement bodily swings the gripper. The screw contacts are adjustable for accurate timing of these actions.

The rocking of the shaft 476 may be effected as follows. Its lower end is shown as resting within a flanged sleeve or socket 483, being secured therein by a key 484. Extending upwardly into the lower part of the socket, and pinned thereto, is a lower rock shaft 485. The socket therefore serves as an effective coupling between the rock shaft 476 and its downward continuation 485. Referring to Fig. 43 the shaft 485 is shown as carrying a bevel pinion 486 at its lower end, this engaging with a toothed segment or a rack 487 which is mounted at the upper end of a rock lever 488 fulcrumed on a bracket 489, the lower end of the lever carrying a cam roll 490 engaging in the groove of an operating cam 491 mounted on the first drive shaft 73. This cam is contoured somewhat analogously to the corresponding cam 370 of the cane feed mechanism, as defined by points a—b—c—d—e and f, so as to give to the rock shaft 476 and rock sleeve 475, in proper timing, the proper extents of oscillation. From a to b the cam causes the gripper to swing from the feedwheel to the head. From c to d the shaft rocks and opens the gripper. From e to f the gripper swings back to the feedwheel and is tilted. From f to a the gripper closes on the pipe.

The connections to prevent the feed of a pipe when the flare is missing from the turret head may operate by rendering inoperative the pawl 463 when the flare is missing thus preventing the indexing of the feedwheel. For this purpose there is indicated a pawl lifter or cam 495 turning loosely on the shaft 461, the lifter being shaped to prevent the pawl 463 engaging the teeth of the ratchet 462. The pawl lifter is connected by a link 496 with a rock lever 497 fulcrumed on a fixed bracket 498 upstanding from the shelf 438, a spring 499 being arranged to pull upon the rock lever, tending to thrust the lifter under the pawl. From the far end of the rock lever extends downwardly a link 500 which is pivoted to the arm 501 of a bell crank lever turning loosely on the rock shaft 469, the other arm 502 of this lever being connected by a long link or rod 503 with a pivoted plate or feeler 504 adapted to stand in the path of the flare A as each head comes to position g. By these connections, when the flare is missing, the spring 499 acts through the lifter 495 to prevent the pawl from indexing the feedwheel. The flare can easily displace the feeler, thus retracting the lifter and allowing the wheel to supply a pipe to the transfer device.

The transfer device 432 comprises primarily a gripper consisting of a relatively fixed jaw 510 and a movable jaw 511, these being carried on a tiltable gripper carrier 512, the whole mounted and operated, as will be described, to swing about the vertical rock shaft 476 as an axis. Fig. 2 shows in dotted lines the gripper device 432 in pipe receiving position below the feedwheel, and in full lines in its rearwardly swung position where it delivers the pipe to the pipe chuck of the turret head. Figs. 37, 39 and 41 show the gripper in its delivering position, while Fig. 38 shows it in its receiving position.

Adjacent the receiving position of the gripper is shown a stop screw 513 mounted on a bracket 514 on the shelf 438, and cooperating with a lug 521 associated with the gripper so that as the gripper comes to receiving position the lug meets the contact, not merely stopping the swing at the proper receiving point, but tilting the gripper to agree with the indicated incline of the feedwheel and exhaust pipe, as will be more fully described.

In general the motions of the gripper are analogous to those of the cane transferring gripper already described. When the gripper is in the Fig. 38 position it closes upon the lowermost pipe in the feedwheel, assuming that the turret head has come to position containing a flare. The gripper then swings bodily rearwardly from the feedwheel, and it tilts to set the pipe upright, namely by spring action as lug 521 retracts from the contact 513, this tilting serving to snap the pipe out of the wheel, the finger 456 readily yielding. The gripper continues to swing back through about 90°, coming to rest at its delivering position. The pipe chuck 125, 126 now surrounds the pipe and closes upon it. The gripper is thereupon opened by a cam operated by the rock shaft 476. As the turret head advances in the next cycle, carrying the pipe with it, the gripper commences its forward swing and retracts to receiving position, where it is again tilted to the proper incline by the fixed contact 513. Another motion is that the gripper mechanism is bodily lifted and dropped during its swinging movements, so that the under parts of the gripper will clear the highest point of the turret head, namely the top of the rod 132.

The gripper device may be further described as follows. Its carrier 512 is a U-shape block to the extremity of which the jaw 510 is fixed. Through the outer portion of the carrier the jaw 511 slides, being confined in a groove therein by a cover plate 516. This movable jaw is attached to a shank 517 which has a threaded connection with the jaw for adjustment and a lock nut 518 holding the adjustment. The carrier is formed with or attached to a sleeve 519 turning in a bearing 542 to be described, and beyond this bearing the sleeve has a collar 520 from which projects a lug or contact 521 adapted to contact with the screw stop 513, for the tilting of the gripper. This tilting is opposed by a pin 523 on the carrier 512 pulled upwardly by a spring 524 attached to a bracket 524ᵃ upstanding from the bearing 542. To stop the spring action and maintain the gripper in position with the pipe upright the carrier has a depending lug 525 contacting against a screw contact 526 on the bearing 542. Near the inner end of the jaw shank 517 is shown a collar 527 which is pressed outwardly by a spring 528 tending to close the gripper, and the extreme end of the shank has a coupling or flange 529 by which the shank can be pulled to open the gripper.

The description of the parts which carry and operate the gripper may best commence with the mounting end thereof, namely near the top ends of the rock shaft 476 and its surrounding rock sleeve 475. Surrounding the rock shaft 476 and rock sleeve 475, above the shelf 438, is shown a fixed cam 530, having a contour as seen in Fig. 41 with a rise 531 between two dwells, for the purpose of lifting the gripper over the obstructing turret head during the swinging of the gripper. The shelf 48 is formed with a circular boss rising slightly above its general level, so as to be engaged by the cam 530, the cam being attached fixedly in this position by clamping screws 532.

Directly above the lifting cam 530 and pinned to the sleeve 475 is shown a headpiece 533 which therefore rocks with the sleeve. This headpiece has opposite extensions 534 constituting trunnion bearings by which the gripper mechanism is carried on the headpiece. Thus the forked end 536 of a liftable carriage 537 is shown connected to the trunnion bearings 534. At its under side the carriage has a roller 538 engaging with the periphery of the lifting cam 530, so that as the carriage swings around it remains in horizontal position excepting as lifted when the roller engages the rise 531 of the cam. The carriage has also an extending pin 539 to which is attached a spring 540, the other end of which is attached to the headpiece 533, the spring therefore pulling the carriage downward and holding the roller to the cam. At its outer end the carriage 537 has an enlargement 542 forming the bearing already mentioned for the tilting movements of the sleeve 519 and gripper carrier.

Next above the head piece 533 on the rock sleeve 475 is a cam 545 on the rock shaft 476. This cam therefore oscillates with the shaft, and during the first part of each oscillation of the shaft the cam oscillates relatively to the headpiece 533, these however all turning in unison after one of the contact screws 479 and 480 has engaged the pin 477. It is the first or relative movement of the cam 545 that is utilized for the opening and closing of the gripper. As seen in Figs. 37 and 41 the cam 545 has a flattened side 546, the remainder of it being concentric. This flattened side is shown as engaged by a contact or follower 548 in the form of a screw attached to the underside of a slide 549. As shown in dotted lines this slide has an elongated slot accommodating the top end of the rock shaft 476, and the shaft at its extreme top has secured to it a washer or collar 550, confining the slide in place, the slide sliding radially on top of the cam 545. The end of the slide opposite its contact screw is shown as forked at 551, these forked ends sliding between the forked ends 536 of the carriage 537, and straddling the gripper jaw shank 517. The forked end has inwardly projecting studs 552 engaging against the outer face of the flange 529 of the jaw shank, so that when the slide is moved frontward, that is to the right in Figs. 37 and 41, it may pull upon the shank 517 and open the gripper against the closing action of spring 528.

In the position shown the gripper is closed upon the exhaust pipe, but as the rock shaft 476 and cam 545 commence to turn clockwise in their return oscillation the flattened side 546 of the cam acting on the follower 548 will force the slide 549 rightward, thus opening the gripper. With further movement of the shaft, as already described, the screw contact 480 will contact the pin 477 and cause the sleeve 475 to turn with the shaft, thus bodily shifting the open gripper back to its receiving position.

Thus the several transfer movements are effected in coordination, the bodily shifting of the gripper between feedwheel and head, its tilting to receive and its straightening up to deliver each pipe, its closing and opening, and its rise and dip to clear obstructing parts. The entire mechanism is supported by the shelf 438, at the top of the front bracket or post 437, and the entirety can be vertically adjusted to coordinate the pipe in the gripper with the head chuck to which it is to be fed, namely by the vertical sliding adjustment being secured by bolts 440, Fig. 37. As adjustment is made the rock shaft 476 may slide within its supporting socket 483, the key 484 permitting this without uncoupling the shaft from the lower rock shaft 485. This shaft 476 conveys the actuation for all of the described motions of the feedwheel and the transfer mechanism.

*Exhaust pipe bending means*

The pipe bending devices effect the step illustrated in Figs. 57 and 58, the devices being shown in Figs. 2, 6, 44 and 45. A fixed bracket 559 is shown from which extend forwardly a bar or cam 560 for adjusting upwardly the exhaust pipe to an exact position and a second bar or bender 561 arranged to effect the bending of the lower end of the pipe as indicated at D'. Both of these actions are shown taking place during and by reason of the travel of the turret head carrying the pipe chuck 125, 126 and pipe D.

As will be clear from Fig. 2, the cam or lifter 560 is arranged to act on the pipes during travel from station g to station h. The successive pipes therefore arrive at station h invariably at the exact level or vertical height required to bend to the correct degree the correct amount of pipe. While pausing at station h flames are concentrated at the place to be bent by means of two rear burners 563 and one front burner 564 shown in Fig. 2, these being connected by appropriate passages with the gas and air connections already described.

The bending member 561 is slightly higher than the cam and is located to act immediately after the head leaves station h, so that while the pipe is still heat-softened it meets the bender, as in Figs. 45 and 58, being thus deflected back and producing the desired bend D'. The bend is directed oppositely to the direction of travel, that is, leftwardly looking from the front of the machine, but when the pipe chuck is later swung inwardly to the center of the head, through 90°, this causes the bend to extend rearwardly, or radially toward the axis of the machine.

The swinging-in of the pipe chuck to the head-axis may commence immediately after the pipe passes from the bender bar 561. The fixed cam portion 194b has already been described which allows the rollers 146 and 147 to swing rearwardly, the pipe chuck thereby being swung toward the axis of the head. This inswinging of the pipe chuck preferably commences during travel between stations h and i, after the bending, but its completion may be delayed to occur subsequently, during travel beyond station i, thus avoiding interference at station i with the flare depressing device, and cam 194b is so designed.

The exhaust pipe, instead of being bent by a fixed bender bar against which the heat-softened pipe travels, may obviously be bent by a positively moved or cam operated bender, preferably of concave form, operating for example during the pause at station h, on the principles disclosed in said prior application, 600,403, but at the outswung or rearward position of the pipe chuck as herein disclosed.

*Vertical readjusting mechanism*

The flare element has now been fed laterally into its chuck in the head, subject to vertical sliding; the cane also has been fed laterally into its chuck below the flare; and the exhaust pipe has been fed laterally into its chuck above the flare, subject to vertical sliding in its chuck, and has been or is about to be swung into axial position; so that all three of these components are in vertical axial alinement in the head, but not yet in proper vertical adjustment. The feed wires are not here mentioned as they are set in by hand and require no mechanical attention.

Mechanism for vertically readjusting the elements may be constructed and operate as follows. See Figs. 2, 7, 8 and 9, the operating being indicated in Figs. 59 and 60.

A depressor arm 570 for the flare may consist of a quite thin or springy piece of metal, mounted on a carrier 571 attached to a vertical actuating rod 572, the depresser extending rearwardly with its extremity over the flare at position i. The lowering of the rod 572 causes the depresser to thrust the flare downwardly to surround the cane, until the lower edge of the flare meets and is stopped by a part of the swingable leadwire jaw in its correct position. The flare skirt will then be above the flare chuck by a distance depending on the length of the flare being handled.

Similarly at station j is a depresser 574, at a higher level, its extremity standing axially above the exhaust pipe D, this depresser being mounted on a carrier 575 which also is attached to the actuating rod 572. Both of the carriers 571 and 575 are adjustably mounted on the rod and are to be set at such vertical positions that the same downward movement of the rod will thrust each of the elements to its proper vertical position, at different stations. As each head comes to station i its flare is thrust down by depresser 570; and as the same head comes to station j the depresser 574 thrusts down the exhaust pipe. The flare is thus caused to surround the upper end of the cane, and the pipe is thrust down more than half way into the flare, with its bent portion extended rearwardly in contact with the glass wall of the flare.

The timed actuation of these parts may be through the following connections. The actuating rod 572 is shown sliding in a vertical slide-way 577 mounted on the frame table 61. The lower end of the rod, below the table, is connected by a link 578 with a rock lever 579 mounted on a depending bracket 580. A spring 581 is arranged to lift the lever and rod so as to restore the depressers to their elevated position. The depressing movement is effected through a roller 582 on the lever operated by a cam 583 on the shaft 73. Or, the cam may be a closed cam and spring 581 omitted.

*Pinching mechanism*

The mechanism for pinching or squeezing the heat-softened flare and cane to consolidate and flatten them in the manner shown in Fig. 61, is herein shown duplicated at stations l and r in case it is desired to effect two pinching operations on each product, although one pinching may be sufficient.

Preceding the pinching actions the elements must be heat-softened, and as shown in Figs. 2 and 5, there is a series of rear burners 586 and front burners 587 commencing at station i, after the flare has been depressed, and continuing substantially through to station r, and therebeyond. Before each head reaches the first pinching station the flare may be collapsed as shown in Figs. 5 and 60 by the pressure of the opposite flames driving against it, and the fusion with the cane and pipe may have commenced. Indeed, the fusion may thus, in some cases, be sufficiently completed to dispense with pinching, although the latter affords a more regular and uniform product.

The pinching or compressing mechanism is sufficiently shown in Figs. 2 and 8. A fixed bracket 600 is mounted on the cap disk 64 and has an arched extension 601 reaching over and down to the front side of the pinching position. Surrounding the pinching position are two special rear burners 607 and two front burners 608 concentrating heat not only on the glass product but on the pinching elements.

The pincher or squeezer itself comprises a rear jaw 611 and an opposing front jaw 612, which are shown mounted at the underside of the inner ends of a pair of opposite shanks 613 slidable on the described bracket. The outer ends of the shanks have upstanding ears to which are attached links 615, the front one of which is shown adjustable so as to permit relative adjustment as between the two jaws. The two links 615 extend respectively to the depending arms 616 of similar bell crank levers pivoted on the arched bracket, each lever having a rearwardly extending arm 617, which two arms 617 are connected by vertical links 618 with the opposite ends of an overhead walking beam 619 pivoted to bracket 601. The rear extremity of the lever 619 is connected by a vertical link 620 with a rocking lever 621 mounted on bracket 600. The rear end of lever 621 is adjacent the central axis of the machine and it is there provided with a contact device 622 comprising a depending shank with a ball at its lower end, this being adjustably mounted on the lever to adjust the pinching action.

This train of connections to the pinching jaws is operated from a pair of flanges 624 arranged at the top of a vertical operating rod 625 sliding in the sleeve 63, at the axis of the machine. The shank of the device 622 may pass through a peripheral notch in the upper flange and its ball may be confined between the two flanges, thus permitting the necessary rocking movement as between the lever 621 and rod 625, with simple adjustment or detachment.

The actuation of these parts may be effected by a rock lever 627 below the frame table, this lever having its inner end pivoted to the lower end of the vertical rod 625, the lever being mounted on a special bracket 628, and having at its outer end a follower 629 engaging the groove of a cam 630 mounted on the second drive shaft 83. The cam is contoured to advance the jaws together on each product during the pause of each head at the pinching station, retracting the jaws in time to permit the next step movement of the turret.

*Perforating means*

This refers to the blowing out, at station *s*, of the exit of the exhaust pipe D where it has been fused at F to the flare A so as to form a perforation G, as shown in Fig. 62, by which the pipe subsequently communicates with the interior of the lamp. Figs. 1 and 2 show the perforating means in top plan view. Fig. 5 in dotted lines shows the application of a flame by a special burner 638 supplemental to the regular burners 586 and 587. Figs. 46 to 50 show the details of the device. This apparatus is shown at station *s* just beyond the second pinching mechanism. From the bracket 601 of the latter extends a special bracket 639 giving support to the perforating means.

Attached to the fixed bracket 639 is a bar 640 held in a vertically adjustable position in a groove in bracket 639 by a fixing screw 641. The bracket also is bored and slit to receive an air tube 642 held in adjustable position by a bolt 643 and supplying air to a nozzle 644 which delivers an air stream into the open top of the flare A to support it against collapse, besides cooling it enough to prevent possible disarrangement of the fused elements.

The fixed bar 640 is bored at its lower end to receive a rock shaft 647 from which hangs a link 648 having pivot stud 649 at its lower end on which is mounted a block 650 constituting the air coupler by which air is supplied into the top end of the exhaust pipe to blow the perforation G while the glass is soft.

The air coupler or block 650 normally rests in an inclined position, as indicated in Figs. 47 and 48 and in dotted lines in Fig. 46. Its longitudinal direction corresponds with the direction of travel of the turret head, and the coupling is so located that the tube D rides under the inclined coupling, as indicated in Fig. 46, lifting it into a horizontal position, and coming to rest in coupled position. The coupling is shown as formed with an underneath recess 651 which converges from its entrance to its coupling end, where a shallow shoulder is provided and therebeyond a notch 652 by which the pipe can pass out of the coupling on the next step movement of the head. Directly above the pausing position of the pipe D the coupling has a vertical air delivery hole 653 supplied with air by a cross passage 654 having an external extension or tube 655 connected by a flexible hose 656 with a suitable air supply and valve so as to give a quick puff of air at the time of perforation. Thus in each cycle while the fused union F is softened by heat the air pressure delivered through the pipe D blows out the desired perforation G.

The mounting of the coupling 650, by which it normally stands in the inclined position shown in Figs. 47 and 48, may be as follows: Above the pivoted end of the coupling it is provided with a contact screw 658 bearing on a pin 659 projecting from the link 648. This screw may be adjusted to give the exact inclined position desired. After the perforating it is required that the tube D shall pass out of engagement with the coupling; it must ride under the shoulder and through the notch 652. This is provided for by the bodily swinging of the combined link and coupling about the rock shaft 647. This shaft has a head 661, from which extends a stop pin 662 engaging a stop pin 663 on the bracket bar 640; while a light spring 664 connecting the head and bar tends to turn the shaft to bring the pin 662 against pin 663. This holds the parts in their normal position shown, but permits their bodily swinging about the shaft 647. The advancing movement of the pipe D, pulling leftward on the coupling as seen in Fig. 46, causes this swinging, against the light resistance of the spring, thereby lifting the left end of the coupling about the shaft 647, the coupling thereby disengaging the pipe, the pipe riding out through the notch 652, and the coupling dropping again to its normal position.

After the blowing out of the perforation G there is apt to be a rough glass edge and it is desirable to smooth this off. Therefore, at station *t* there is shown another special rear burner 670 similar to 638. As shown in Figs. 1 and 4, this is directed toward the perforation to soften and thereby smooth the glass. To prevent undue softening there is shown an air nozzle 671 through which relatively cool air may be directed into the flare A to cool the joint F and prevent internal softening which might impair the product.

After this smoothing action the product may be further cooled, for example, beyond station t, by successive inside and outside air nozzles 673 and 674 directing air jets to the inside and outside of the flare.

*Outfeeding mechanism*

The completed product or lamp stem H, as shown in Fig. 63, now requires to be outfed from the head of the turret. This involves the release of the product from the several chucks and the unloading of it from the head, preferably mechanically, to be carried away to a suitable receptacle or handling point.

These operations have been partially explained in connection with Figs. 1, 7 and 8 and the details of the outfeeding mechanism are further shown in Figs. 51 to 54.

As already explained, in the neighborhood of station w, the flare chuck is opened by the fixed cam 191, and it stays open until the head reaches station a. About the same time the exhaust pipe chuck is opened by the cam 195, while at or near station w, and the pipe chuck is then swung back by cam 194a, where cam 195 allows it to close again. About this time the cam roll 177 which operates the wire chuck is opposite its cam 197a, but the chuck is not yet opened because the carriage 150 is still at its inward position. As soon as the carriage swings out, as next described, the roll meets the cam and opens the wire chuck, which remains open.

The cane chuck, without opening, is now swung bodily frontward with the carriage 150 by the cam 192a, the product H being thus carried frontward for delivery. This swinging of the carriage and product is effected after the flare and pipe chucks have opened and while the head is traveling from station w to x, and the wire chuck opens by this swing, as described. This outswinging of the cane chuck and carriage thus brings the product frontward so that when the head comes to a pause at station x the product is not only held by the cane chuck, but also is engaged in the outfeeding mechanism next to be described. The cane chuck and the carriage 150 carrying it are held in their outswung positions until after receiving a new cane at station c.

The outfeeding mechanism is in front of the turret substantially opposite station x. It is mounted on an extension table or bracket 679 which is attached to the extension table 204 of the flare infeeding mechanism. At the delivery point the outfeeding mechanism commences with a pair of inclined rails 680 constituting a chute by which the delivered products are carried down from the delivery point to a conveyor or other device. The upper or rear ends of the rails 680 are bent contrary to the direction of head travel, forming a couple of prongs 681, which may be considered as enclosing between them the mouth or entrance of the chute. These rails 680 are supported on upright posts 682 upstanding from a horizontal bracket 683 which constitutes a rear extension of a forwardly extending bracket 684 mounted on an upstanding part 685 of the table 679.

Each product H delivered into the mouth 681 of the chute slides down the inclined rails 680 and passes therefrom to an outfeeding conveyor. Thus, upstanding from the brackets 683 are vertical shafts 687 carrying at their upper ends sprocket wheels 688 around which pass sprocket chains 689, running along the top sides of the conveyor bracket 684. This conveyor system is operated at a slow speed and the received products are held on the chains by the flare flanges and are carried forwardly to a desired disposal point, the travel of the sprocket chains preferably extending through a box or annealing chamber wherein the products may be heated and cooled for annealing them.

The release of the product H from the cane chuck to the outfeeding chute involves the opening of the chuck at station x after the product has been deposited in the mouth 681 of the chute. The swinging motion of the cam part 193a is utilized to effect this transfer. This cam part moves inwardly, that is, to the right in Figs. 1, 51, 52 and 53, to open the cane chuck. On top of this cam part 193a is a tall post 692 shown in elevation in Fig. 54, carrying certain members which therefore move to the right with the opening of the cane chuck and which return leftward thereafter, this return movement starting the product down the inclined part of the chute. At the top of the post is a hook member 693 arranged to engage behind the exhaust pipe D of the product when shifted rearward. At a lower point is a plate 694 having a hooked end adapted to engage behind the flare A of the product. These hooks or pullers therefore on the next frontward or return motion tend to draw the product along the inclined part of the chute. The post 692 carries also an arm 696 on which is attached one end of a looped spring finger 697, cooperating with the hooks 693, 694 and normally in contact with a pin 698 on the adjacent chute rail. This spring finger, when the hooks are moved rearward, moves also rearward from the position of Figs. 51 and 53 to the position of Fig. 52. This carries the finger from the pin 698 and allows its loop to expand, which thrusts the product H leftward enough to engage in front of the hooks, so that the frontward return movement will surely cause the product to move frontward and so start down the chute. The new contact of the finger with the pin retracts the finger loop enough to release the product, to slide by gravity down the chute and on to the conveyor.

The outfeeding devices may be varied in many ways, for example, instead of the chute being arranged to receive the product while still on the carriage 150, a segment or transfer member can be provided, analogous to that at the flare infeed, operated to engage and take the product by its flare, and, after the cane chuck has opened, to swing out and deposit the product in the open end of a horizontal trackway, from which it is pushed forward to the conveyor chains.

There has thus been described a machine for producing lamp stems from the components thereof, embodying the present invention and attaining the objects thereof. Since many matters of operation, combination and construction may be variously modified without departing from the principles of the invention it is not intended to limit the invention to such matters except to the extent specified in the appended claims.

What is claimed is:

1. A machine for producing lamp stems from the components thereof, comprising a series of traveling heads with drive means to advance them around an orbit from station to station, each of the heads having a flare chuck with jaws adapted to receive and release laterally the glass flare with its flared end above, and a cane chuck with jaws adapted to receive and release laterally the glass cane at a position below the flare, and a pipe chuck with jaws adapted to receive and release laterally the glass exhaust pipe at a position above the flare, mechanisms for infeeding from the front of such orbit to the head at different stations and inserting laterally into said chucks respectively the flare, the cane and the pipe, means for causing the closing of each of said chucks in coordination with the head travel and the infeed of the components thereto, mechanism acting subsequently in the travel of the head for vertically readjusting the assembled components so that the flare surrounds the ends of the cane and the pipe, means for heat-softening the assembled components for fusing them together, means for outfeeding the lamp stem product laterally frontward from the head, and means for causing the opening of each chuck to release the product in coordination with the head travel and the outfeed of product therefrom.

2. A machine for producing lamp stems from the components thereof, comprising a series of traveling heads with drive means to advance them around an orbit from station to station, each of the heads having a flare chuck with jaws adapted to receive and release laterally the glass flare with its flared end above, and a cane chuck with jaws adapted to receive and release laterally the glass cane at a position below the flare, and a leadwire chuck opening laterally adjacent the cane chuck, and a pipe chuck with jaws adapted to receive and release laterally the glass exhaust pipe at a position above the flare, mechanisms for infeeding to the head at different stations and inserting laterally into their chucks respectively the flare, the cane and the pipe, means for causing the closing of each of said chucks in coordination with the head travel and the infeed of the components thereto, means for heat-softening the lower end of the pipe and bending it laterally, mechanism acting subsequently in the travel of the head for vertically readjusting the assembled components so that the flare surrounds the ends of the cane and the pipe, means for heat-softening the assembled components for fusing them together, means for pinching the fused flare and cane to compress them, means for forcing air through the pipe to blow a perforation through its point of fusion to the flare while heat-softened, means for outfeeding the lamp stem product laterally frontward from the head, and means for causing the opening of each chuck to release the product in coordiation with the head travel and the outfeed of product therefrom.

3. A machine for producing lamp stems from the components thereof, comprising a series of traveling heads with drive means to advance them around an orbit from station to station, each of the heads having a flare chuck with jaws adapted to receive and release laterally the glass flare with its flared end above, and a cane chuck with jaws adapted to receive and release laterally the glass cane at a position below the flare, and a pipe chuck with jaws adapted to receive and release laterally the glass exhaust pipe at a position above the flare, means for causing the closing of each of said chucks in coordination with the head travel and the receiving of the components therein, mechanism acting subsequently in the travel of the head for vertically readjusting the assembled components so that the flare surrounds the ends of the cane and the pipe, means for heat-softening the assembled components and fusing them together, means for forcing air through the pipe to blow a perforation through its point of fusion to the flare while heat-softened, means for outfeeding the lamp stem product laterally from the head, and means for causing the opening of two of said chucks to release the product therefrom, and thereupon shifting the third chuck bodily laterally to carry the product to the outfeeding means, and causing its opening to release the product to the outfeeding means.

4. A machine for producing lamp stems from the components thereof, comprising a series of traveling heads with drive means to advance them around an orbit from station to station, each of the heads having a flare chuck with jaws adapted to receive and release laterally the glass flare with its flared end above, and a cane chuck with jaws adapted to receive and release laterally the glass cane at a position below the flare, and a pipe chuck with jaws adapted to receive and release laterally the glass exhaust pipe at a position above the flare, means for causing the closing of each of said chucks in coordination with the head travel and the receiving of the components therein, means for heat-softening the lower end of the pipe, and a bender operating by reason of the advancing travel for bending lateraly such lower end of the pipe, mechanism acting subsequently in the travel of the head for vertically readjusting the assembled components so that the flare surrounds the ends of the cane and the pipe, and means for heat-softening the assembled components for fusing them together.

5. A machine for producing lamp stems from the components thereof, comprising a series of traveling heads with drive means to advance them around an orbit from station to station, each of the heads having a flare chuck with jaws adapted to receive and release laterally the glass flare with its flared end above, and a pipe chuck with jaws adapted to receive and release laterally the glass exhaust pipe at a position above the flare, a carriage carrying the pipe chuck and shiftable to shift the chuck from a central position over the flare to an outward position and return, means for causing the closing of each of said chucks in coordination with the head travel and the receiving of the components therein, means for heat-softening the lower end of the pipe, and means operating while the pipe chuck is in outward position for bending laterally such lower end of the pipe, mechanism acting subsequently in the travel of the head for vertically readjusting the assembled components so that the flare surrounds the end of the pipe, means for heat-softening the assembled components for fusing them together, and means for forcing air through the pipe to blow a perforation through its point of fusion to the flare while heat-softened.

6. A machine as in claim 5 and wherein the pipe bending means operates in the direction of travel, and the pipe chuck carriage shifts by swinging through substantially 90° whereby the bend extends laterally when swung in above the flare, and the perforation is subsequently formed laterally.

7. A machine as in claim 5 and wherein the perforating means comprises an air coupling under which the pipe top rides by its travel, and connections for delivering a puff of air therethrough while the pipe and coupling are in register.

8. A machine as in claim 5 and wherein the perforating means comprises an air coupling under which the pipe top rides by its travel, and connections for delivering a puff of air therethrough while the pipe and coupling are in register; the coupling being capable of lifting to allow the pipe to advance out of engagement therewith.

9. A machine for producing lamp stems from the components thereof, comprising a series of traveling heads with drive means to advance them around an orbit from station to station, each of the heads having a flare chuck with jaws adapted to receive and release laterally the glass flare with its flared end above, and a cane chuck with jaws adapted to receive and release laterally the glass cane at a position below the flare, and a pipe chuck with jaws adapted to receive and release laterally the glass exhaust pipe at a position above the flare, means for causing the closing of each of said chucks in coordination with the head travel and the receiving of the components therein, mechanism acting subsequently in the travel of the head for vertically readjusting the assembled components so that the flare surrounds the end of the cane and the pipe, means for heat-softening the assembled components and fusing them together, comprising opposite pinching jaws and connections actuating them including a lever having one end near the central axis of rotary head travel, a vertical actuator rod slidable at such axis, a connection from the rod to the lever, and timed or cam means actuating the lower end of the rod.

10. A machine for producing lamp stems from the components thereof, comprising an endless series of traveling heads with drive means to advance them around a circular orbit from station to station, each of the heads having a flare chuck with jaws adapted to receive and release laterally the glass flare with its flared end above, and a cane chuck with jaws adapted to receive and release laterally the glass cane at a position below the flare, a shiftable carriage carrying the cane chuck, means for causing the closing of each of said chucks in coordination with the head travel and the receiving of the components therein, and for swinging in the cane chuck carriage to centralize the cane below the flare, mechanism for vertically readjusting the assembled components so that the flare surrounds the end of the cane, means for heat-softening the assembled components and fusing them together, means for causing the opening of the flare chuck and subsequently the cane chuck to release the product in coordination with the head travel and the outfeed of product therefrom, and means for shifting laterally outward the carriage and cane chuck after the opening of the flare chuck but before the opening of the cane chuck.

11. A machine as in claim 10 and wherein the cane chuck and its carriage are swingable laterally inwardly to centralize the cane and laterally outwardly to carry bodily the completed lamp stem product to outfeeding position, together with outfeeding mechanism for receiving each product from the outswung cane chuck and conducting it to a receiving place.

12. A machine as in claim 10 and wherein the cane chuck and its carriage are swingable laterally inwardly to centralize the cane and laterally outwardly to carry bodily the completed lamp stem product to outfeeding position, and wherein is outfeeding mechanism for receiving each released product from the outswung can chuck and transferring it to an outfeeding conveyor, and such conveyor.

13. A machine for producing lamp stems from the components thereof, comprising a series of traveling heads with drive means to advance them around an orbit from station to station, each of the heads comprising a head frame carrying the following chucks, a flare chuck with jaws adapted to receive and release laterally the glass flare with its flared end above, a cane chuck with jaws adapted to receive and release laterally the glass cane at a position below the flare, a leadwire chuck opening laterally adjacent the cane chuck, and a pipe chuck with jaws adapted to receive and release laterally the glass exhaust pipe at a position above the flare; means for causing the closing of each of said chucks in coordination with the head travel and the receiving of the components therein, mechanism for vertically readjusting the assembled components so that the flare surrounds the ends of the cane and the pipe, means for heat-softening the assembled components and fusing them together, means for outfeeding the lamp stem product laterally from the head, and means for causing the opening of each chuck to release the product in coordination with the head travel and the outfeed of product therefrom.

14. A machine for producing lamp stems from the components thereof, comprising a series of traveling heads with drive means to advance them around an orbit from station to station, each of the heads comprising a head frame carrying the following chucks, a flare chuck with jaws adapted to receive and release laterally the glass flare with its flared end above; a cane chuck with jaws adapted to receive and release the glass cane at a position below the flare, and a pipe chuck with jaws adapted to receive and release the glass exhaust pipe at a position above the flare; means for causing the closing of each of said chucks in coordination with the head travel and the receiving of the components therein; two of said chucks being constructed to permit vertical readjustment of the components so that the flare may be caused to surround the ends of the cane and the pipe; means for fusing together the assembled components, and means for causing the opening of each chuck to release the product in coordination with the head travel and the outfeed of product therefrom.

15. A machine as in claim 14 and wherein one or more of said chucks comprises a movable jaw, operating connections including a vertical rockshaft, a rockarm at the foot of the shaft, and cam means operative at different positions of travel to rock said arm.

16. A machine as in claim 14 and wherein one or more of said chucks comprises a fixed jaw determining the central position of the component, a movable jaw, a spring closing the movable jaw, and a non-traveling cam for opening the jaw and timing its closing.

17. A machine for producing lamp stems from the components thereof, comprising a series of traveling heads with drive means to advance them around an orbit from station to station, each of the heads comprising a head frame carrying the following chucks, a flare chuck with jaws adapted to receive and release laterally the glass flare with its flared end above, a cane chuck with jaws adapted to receive and release the glass cane at a position below the flare, and a pipe chuck with jaws adapted to receive and release the glass exhaust pipe at a position above the flare; one or more of said chucks being bodily shiftable between central operating position and an outward component-receiving position, timed means for causing the closing of each of said chucks and the inward shifting of each of said shiftable chucks in coordination with the head travel and the receiving of the components therein, means for uniting the assembled components, and timed means for causing the opening of each chuck to release the product in coordination with the head travel and the outfeed of product therefrom.

18. A machine as in claim 17 and wherein is timed means for shifting one of said chucks outwardly with the product before such chuck is opened but after the other chucks have opened.

19. A machine for producing lamp stems from the components thereof, comprising a series of traveling heads with drive means to advance them around an orbit from station to station, each of the heads comprising a head frame carrying the following chucks, a central flare chuck with jaws adapted to receive and release laterally the glass flare with its flared end above, a cane chuck with jaws adapted to receive and release the glass cane at a position below the flare, with a shiftable carriage carrying the cane chuck between central position and an outward position, and a pipe chuck with jaws adapted to receive and release the glass exhaust pipe at a position above the flare; means for causing the closing of each of said chucks and the inward shifting of the carriage and cane chuck in coordination with the head travel and the receiving of the components therein, means for uniting the assembled components, and means for causing the opening of the flare and pipe chucks to release the product and thereupon shifting outward said carriage with the product and opening the cane chuck to release the product.

20. A machine as in claim 19 and wherein is a leadwire chuck carried adjacent the cane chuck on said carriage, and means to close and open the leadwire chuck in coordination with the head travel and outfeed of product.

21. A machine as in claim 17 and wherein the exhaust pipe chuck is bodily shiftable between an outward receiving position and a central position, with means for bending the lower end of the pipe in said chuck before its shifting to central position.

22. A machine as in claim 19 and wherein the pipe chuck also has a shiftable carriage carrying it between central and outward positions.

23. A machine for producing lamp stems from the components thereof, comprising a series of traveling heads with drive means to advance them around an orbit from station to station, each of the heads having a chuck for each glass component, including a flare chuck with jaws adapted to receive and release laterally the glass flare with its flared end above, means for causing the closing of said chucks in coordination with the head travel and the receiving of the components therein, and mechanism for infeeding flares laterally to said flare chuck comprising a chute and a transfer member operated to receive each flare from the chute and transfer it laterally into the open flare chuck, and means to supply a succession of flares to the transfer member.

24. A machine for producing lamp stems from the components thereof, comprising a series of traveling heads with drive means to advance them around an orbit from station to station, each of the heads having a chuck for each glass component, including a flare chuck with jaws adapted to receive and release laterally the glass flare with its flared end above, means for causing the closing of said chucks in coordination with the head travel and the receiving of the components therein, and mechanism for infeeding flares laterally to said flare chuck comprising a hopper with a pickup wheel rotatable therein, a chute to which the pickup wheel delivers flares, and a transfer member operated to receive each flare from the chute and transfer it laterally into the open flare chuck.

25. A machine as in claim 24 and wherein the pickup wheel has means rotating it intermittently in one direction, and the wheel comprises a plurality of pairs of substantially radial tracks on which the flare skirts may rest, said tracks delivering toward the wheel axis and thence to the chute.

26. A machine as in claim 24 and wherein the wheel comprises spaced walls with opposite apertures forming flare tracks adapted to pick up flares from the hopper and deliver them toward the wheel axis, a hollow wheel hub with door for the passage of flares from the tracks, and the chute having a curved extension into the hub to receive flares from the tracks.

27. A machine for producing lamp stems from the components thereof, comprising a series of traveling heads with drive means to advance them around an orbit from station to station, each of the heads having a chuck for each glass component, including a flare chuck with jaws adapted to receive and release laterally the glass flare with its flared end above, means for causing the closing of said chucks in coordination with the head travel and the receiving of the components therein, and mechanism for infeeding flares laterally to said flare chuck comprising a hopper, a chute receiving flares from the hopper, and a transfer member operated to receive each flare from the chute and transfer it laterally into the open flare chuck.

28. A machine as in claim 27 and wherein the transfer member is pivoted to swing between the chute end and the head, and is constructed with a recess to engage the shank of the flare in the chute exit and carry it laterally to the flare chuck of the head.

29. A machine as in claim 27 and wherein the transfer member is pivoted to swing between the chute end and the head, and is constructed with a recess to engage the shank of the flare in the chute exit and carry it laterally to the flare chuck of the head, and wherein is a guard inserted in the chute during transfer to restrain the next flare.

30. A machine as in claim 27 and wherein the transfer member is pivoted to swing between the chute end and the head, and is constructed with a recess to engage the shank of the flare in the chute exit and carry it laterally to the flare chuck of the head, and wherein is a gate normally closing the chute exit and having means for opening it for transfer.

31. A machine as in claim 24 and wherein is a feeler for detecting the presence of flares at a predetermined point in the chute, means intermittently operating the feeler, and means controlled by the feeler to suspend rotation of the pickup wheel when the chute is filled to the designated point.

32. A machine for producing lamp stems from the components thereof, comprising a series of traveling heads with drive means to advance them around an orbit from station to station, each of the heads having a chuck for each glass component, including a flare chuck, and a cane chuck with jaws adapted to receive and release laterally the glass cane below the flare, means for causing the closing of said chucks in coordination with the head travel and the receiving of the components therein, and mechanism for infeeding canes laterally to said cane chuck comprising a hopper for a stack of canes, a delivery wheel below the hopper with a series of peripheral means or kerfs engaging the successive canes and carrying them from the hopper, and a transfer device or gripper operated to engage each cane by its opposite ends, take it from the wheel, tilt it upright, and shift it into the cane chuck of the head before the closing of the chuck.

33. A machine for producing lamp stems, comprising a series of traveling heads with drive means to advance them around an orbit from station to station, each of the heads having means for holding a glass flare and a chuck for holding a component to be united thereto, and said chuck having jaws adapted to receive the release laterally the said component, and mechanism for infeeding components laterally to said chuck comprising a hopper for a stack of components, a delivery wheel below the hopper with a series of peripheral means or kerfs engaging the successive components and carrying them from the hopper, and a transfer device or gripper operated to engage each component, take it from the wheel, tilt it upright, and shift it into the said chuck.

34. A machine as in claim 33 and wherein is a guard wall, holding the components in the wheel kerfs during rotation from the hopper to the delivery point, and a yieldable retainer at the delivery point permitting the transfer device to snap the component from the wheel.

35. A machine as in claim 33 and wherein the transfer device is tilted by an adjustable contact adjacent the wheel as the device nears the wheel.

36. A machine as in claim 33 and wherein is a vertical rocksleeve carrying the transfer device, a rockshaft within the sleeve having connections for rocking it through a predetermined angle, stops between the shaft and sleeve whereby the shaft may rock the sleeve after a lost motion, and means carried by the sleeve for opening and closing the transfer device, operated by such lost motion preceding each rocking of the sleeve.

37. A machine for producing lamp stems, comprising a series of traveling heads with drive means to advance from around an orbit from station to station, each of the heads having means for holding a glass flare and a chuck for holding a component to be united thereto, and said chuck having jaws adapted to receive and release laterally the said component, and mechanism for infeeding components laterally to said chuck comprising a hopper for a stack of components, a delivery wheel below the hopper with a series of peripheral means or kerfs engaging the successive components and carrying them from the hopper, and means for indexing it in each operation to bring a new component to delivery point, a transfer device or gripper operated to engage each component, take it from the wheel, tilt it upright, and shift it into the said chuck, and control means comprising a feeler to detect the presence of a flare in the head and connections operated by the feeler to prevent indexing of the wheel when the flare is absent.

38. A machine for producing lamp stems, comprising a series of traveling heads with drive means to advance them around an orbit from station to station, each of the heads having means for holding a glass flare and a chuck for holding an exhaust pipe to be united thereto, and said chuck having jaws adapted to receive and release laterally the said pipe, and mechanism for infeeding pipes laterally to said chuck comprising a hopper for a stack of pipes, a delivery wheel below the hopper with a series of peripheral means or kerfs engaging the successive pipes and carrying them from the hopper, and a transfer device or gripper operated to engage each pipe by its opposite sides, take it from the wheel, tilt it upright, and shift it into the said chuck, said infeeding mechanism being bodily adjustable up and down for longer or shorter pipes.

39. A machine for producing lamp stems from the components thereof, comprising a series of traveling heads with drive means to advance them around an orbit from station to station, each of the heads comprising a head frame carrying the following chucks, a flare chuck with jaws adapted to receive and release laterally the glass flare with its flared end above, and to permit the flare being slid downwardly therein, a cane chuck with jaws adapted to receive and release the glass cane at a position below the flare, and a pipe chuck with jaws adapted to receive and release the glass exhaust pipe at a position above the flare, and to permit the pipe being slid downwardly therein; means for causing the closing of each of said chucks in coordination with the head travel and the receiving of the components therein, and means for readjusting the assembled components, comprising a pusher to depress the flare at one point of travel, a pusher to depress the pipe into the flare at another point of travel, and a single means to lower both pushers at each operation.

40. A lamp-stem-making machine with a series of traveling heads, each having chucks for holding the flare and other components in axial position, mechanisms infeeding such components successively to their chucks, and means to heat and unite the components; characterized in that in each head one of the chucks is bodily shiftable from its axial to an outer position for delivery of the completed lamp stem after the other chucks have released it.

41. Machine as in claim 40, and wherein the cane chuck is on a carriage operated to swing outward to receive the cane, then to axial position beneath the flare chuck, and after the components have been united, outward again carrying the completed lamp stem to delivery position.

42. Machine as in claim 40, and wherein adjacent the head series is an outfeeding conveyor for the completed lamp stem and a device to deliver the stem from the outshifted chuck of each head to the outfeeding mechanism.

43. Lamp-stem-making machine with a series of traveling heads, each having chucks for holding the flare and other components in axial position, mechanisms infeeding such components successively to their chucks, and means to heat and unite the components; characterized in that at one station the flare infeeding mechanism is arranged and operates to infeed the flare laterally to axial position to be grasped by its chuck, and at a subsequent station, the cane and pipe infeeding mechanisms are arranged and operate to infeed the cane and pipe respectively laterally to their chucks; and characterized further by means whereby the absence of a flare prevents feed of cane or pipe to the head, and by means to lower the flare and pipe to cause the flare to surround the cane and pipe.

44. Lamp-stem-making machine with a series of traveling heads, each having chucks for holding the flare and exhaust pipe in axial position, mechanisms infeeding such components successively to their chucks, and means to heat and unite the components; characterized in that in each head the pipe chuck is bodily shiftable from its axial to an outer position to hold offset the pipe, and characterized by means to heat and there bend the lower end of the pipe before the chuck is shifted to axial position.

DONALD G. TRUTNER.